US012794285B2

(12) United States Patent
Yu et al.

(10) Patent No.: US 12,794,285 B2
(45) Date of Patent: Nov. 10, 2026

(54) STATOR FOR MOTOR, MOTOR, AND HOUSEHOLD APPLIANCE

(71) Applicant: BSH Hausgeräte GmbH, Münich (DE)

(72) Inventors: Jian Yu, Suqian (CN); Zhengwei Li, Nanjing (CN); Zhao Guan, Nanjing (CN)

(73) Assignee: BSH Hausgeräte GmbH, Münich (DE)

(*) Notice: Subject to any disclaimer, the term of this patent is extended or adjusted under 35 U.S.C. 154(b) by 206 days.

(21) Appl. No.: 18/751,879

(22) Filed: Jun. 24, 2024

(65) Prior Publication Data

US 2025/0062647 A1 Feb. 20, 2025

(30) Foreign Application Priority Data

Aug. 15, 2023 (CN) ......................... 202311027793.1

(51) Int. Cl.
*H02K 1/20* (2006.01)

(52) U.S. Cl.
CPC ...................................... *H02K 1/20* (2013.01)

(58) Field of Classification Search
CPC ............... H02K 1/20; H02K 1/32; H02K 5/12
USPC ............................................... 310/52, 54, 64
See application file for complete search history.

(56) References Cited

U.S. PATENT DOCUMENTS 11,949,286 B2 * 4/2024 Yu .......................... H02K 1/185
2010/0026111 A1 * 2/2010 Monzel .................... H02K 1/20 310/59
2012/0080983 A1 * 4/2012 Iund ......................... H02K 1/20 310/60 A
2014/0183988 A1 * 7/2014 Kulkarni .................. H02K 1/20 310/54
2014/0265666 A1 * 9/2014 Shoykhet ............... H02K 9/197 310/59
2014/0361649 A1 * 12/2014 Chong ................... H02K 1/185 310/54
2020/0227977 A1 * 7/2020 Bradfield ................. H02K 1/20
2020/0389064 A1 * 12/2020 Leong .................... H02K 5/203
2021/0203196 A1 * 7/2021 Nigo ...................... H02K 3/345
2022/0239170 A1 * 7/2022 Bradfield ................. H02K 1/20
2023/0231437 A1 * 7/2023 Kaiser ...................... H02K 1/16 310/54
2023/0369924 A1 * 11/2023 Luo .......................... H02K 1/20
2024/0048009 A1 * 2/2024 Luo .......................... H02K 9/19

(Continued)

FOREIGN PATENT DOCUMENTS

CN 115242004 A 10/2022
DE 3334501 A1 3/1984
DE 102015215762 A1 2/2017

*Primary Examiner* — Rashad H Johnson

(74) *Attorney, Agent, or Firm* — Laurence A. Greenberg; Werner H. Stemer; Ralph E. Locher

(57) ABSTRACT

A household appliance has a motor with a stator. The stator includes an iron core having at least one lamination unit arranged in an axial direction of the stator; and at least one cavity channel, formed inside the lamination unit. An inlet and an outlet that are in communication with each cavity channel are respectively formed on outer surfaces of the lamination unit. In the axial direction of the stator, the outlet and the inlet have a height difference. The heat dissipation performance of the stator is thereby improved by reducing a temperature of the motor and also efficiency and power density of the motor are improved.

20 Claims, 11 Drawing Sheets

(56) References Cited

U.S. PATENT DOCUMENTS

| | | | | |
|---|---|---|---|---|
| 2024/0055915 | A1* | 2/2024 | Bradfield | H02K 5/203 |
| 2025/0096625 | A1* | 3/2025 | Tailor | H02K 5/15 |

* cited by examiner

STATOR FOR MOTOR, MOTOR, AND HOUSEHOLD APPLIANCE

CROSS-REFERENCE TO RELATED APPLICATION

This application claims the priority, under 35 U.S.C. § 119, of Chinese Patent Application CN 202311027793.1, filed Aug. 15, 2023; the prior application is herewith incorporated by reference in its entirety.

FIELD AND BACKGROUND OF THE INVENTION

Embodiments of the present invention relate to the technical field of motors, and specifically, to a stator for a motor, a motor, and a household appliance.

A stator is one of a few key components of a motor. It is a major part of a magnetic circuit and is configured to mount a stator winding. During operation of the motor, a stator core is subjected to a combined effect of a mechanical force, thermal stress, and an electromagnetic force. Therefore, a temperature rise of the stator core plays a crucial role for safe and stable operation of the motor. A stator with poor heat dissipation performance causes an overall temperature of the motor to be excessively high, and consequently, indicators of the motor such as working efficiency and a power density are adversely affected.

Currently, heat dissipation of the stator is mainly implemented through a surface of the stator that is not covered by a housing. Because a surface of an exposed part is generally flat and has a small surface area, a heat dissipation effect of the stator is poor. Even if a heat dissipation rib is additionally arranged on an end cap of the motor, the effect of accelerating dissipation of heat inside the stator is limited.

SUMMARY OF THE INVENTION

An objective of embodiments of the present invention is to provide a stator for a motor, a motor, and a household appliance that are improved.

Therefore, an embodiment of the present invention provides a stator for a motor, including: an iron core, including at least one lamination unit arranged in an axial direction of the stator; and at least one cavity channel, formed inside the lamination unit. An inlet and an outlet that are in communication with each cavity channel are respectively formed on outer surfaces of the lamination unit, and in the axial direction of the stator, the outlet and the inlet have a height difference.

Compared with an existing motor stator, only a heat dissipation surface is formed on an outer surface, and heat inside the stator needs to be radiated to the surface to eventually be dissipated, and heat dissipation efficiency is low. The solution of the present disclosure can improve heat dissipation performance of the stator. This helps reduce the temperature of the motor and improve efficiency and power density of the motor. Specifically, a cavity channel of a three-dimensional spatial structure is formed inside the iron core of the stator, to increase heat-dissipation surface area of the lamination. Further, there is a height difference between the inlet and the outlet of the cavity channel in the axial direction of the stator, so that air convection is formed. When an airflow flows along the cavity channel, the airflow takes away heat generated in the iron core. In this way, heat can be directly dissipated from a heat source to the air, thereby further improving heat dissipation efficiency. The stator with better heat dissipation performance can reduce the overall temperature of the motor, and improve the efficiency and power density, for example, a maximum output capability of the motor.

Further, natural convection is achieved in the cavity channel by using a self-pulling force of the hot air during rise. An airflow naturally flows in the cavity channel without additionally arranging a driving mechanism to perform air evacuation, thereby improving the heat dissipation efficiency. When the motor is in operation and the stator generates heat, heat on the stator winding is transferred to the iron core, air in the cavity channel is heated and then takes away heat while flowing along the cavity channel from bottom to top, and cold air is automatically added from the bottom. Compared to a heat-dissipation surface area of a conventional iron core of a stator, a surface area of an interior of each of the plurality of cavity channels is greatly increased, thereby greatly improving the heat dissipation efficiency. Therefore, the stator in this embodiment can greatly reduce the temperature of the motor, thereby reducing energy consumption of the motor, improving efficiency, and increasing power density of the motor, so that the motor with the same size has higher output.

Optionally, inlets and outlets that are in communication with the same cavity channel are respectively formed on outer surfaces on different sides of the lamination unit. Therefore, a length of the cavity channel meandered inside the iron core may be increased, to increase the heat dissipation surface area, thereby further facilitating heat dissipation.

Optionally, the lamination unit includes a plurality of laminations, a hole portion is formed in each lamination, and the hole portion is suitable for forming a part of the cavity channel. Therefore, the cavity channel may be formed in the iron core by using a simple lamination process. The production process is simple and easy to implement, and manufacturing costs are low. Further, openings are provided at appropriate positions on each lamination to form the hole portion, and after the plurality of laminations are finally stacked, a channel of a spatial structure may be formed in the iron core of the stator to facilitate heat dissipation. Shapes and structures of the laminations may be the same or different, so that the design of the cavity channel in this embodiment can be flexibly adapted to the iron core of the stator of various structural designs.

Optionally, the lamination unit includes a plurality of laminations in the same shape, where the plurality of laminations sequentially are rotated by a preset angle to stack into the lamination unit. A plurality of hole portions arranged in a circumferential direction of the stator are formed in each lamination, and a plurality of hole portions respectively formed in every two adjacent laminations are penetrated in the axial direction of the stator, to form a plurality of cavity channels. Therefore, the plurality of laminations with the same opening layout are rotated and stacked, so that the iron core of the stator with the plurality of cavity channels is manufactured, and the manufacturing process is simple and costs are low. Specifically, a channel of a spatial structure is formed on the iron core of the stator after the plurality of laminations of the same design are rotated by an angle, to facilitate heat dissipation. Because opening layouts of the openings on each lamination is the same, the entire iron core can be produced by developing a single mold. This reduces opening costs and process complexity.

Optionally, the lamination unit includes a first lamination, a second lamination, a third lamination, and a fourth lamination that are sequentially arranged in the axial direction of the stator. A first hole, a second hole, a third hole, and a fourth hole that are sequentially arranged in the circumferential direction of the stator are formed in the laminations, and the at least one cavity channel includes a first cavity channel, a second cavity channel, a third cavity channel, and a fourth cavity channel, where every two of the first hole of the first lamination, the second hole of the second lamination, the third hole of the third lamination, and the fourth hole of the fourth lamination are penetrated in the axial direction of the stator to form the first cavity channel. Every two of the second hole of the first lamination, the third hole of the second lamination, the fourth hole of the third lamination, and the first hole of the fourth lamination are penetrated in the axial direction of the stator to form the second cavity channel. Every two of the third hole of the first lamination, the fourth hole of the second lamination, the first hole of the third lamination, and the second hole of the fourth lamination are penetrated in the axial direction of the stator to form the third cavity channel, and every two of the fourth hole of the first lamination, the first hole of the second lamination, the second hole of the third lamination, and the third hole of the fourth lamination are penetrated in the axial direction of the stator to form the fourth cavity channel. Therefore, the single lamination unit has four cavity channels distributed in the circumferential direction of the stator, and each cavity channel penetrates through at least a part of the interior of the lamination unit in the axial direction of the stator, so that heat inside the iron core can naturally flow from the inlet on the lower side to the outlet on the upper side/side surface along the cavity channel, and the heat is quickly dissipated to the outside of the iron core.

Optionally, for each cavity channel, projections of the hole portions formed in the adjacent laminations and suitable for forming the cavity channel at least partially overlap in the axial direction of the stator. Therefore, it is ensured that after the plurality of laminations are stacked, the front and rear hole portions remain in communication, to form a through channel inside the iron core of the stacked stator.

Optionally, the projections of the hole portions formed in at least two adjacent laminations completely overlap in the axial direction of the stator. In this way, the surface area of the interior of the cavity channel is larger. This increases the flow speed of an airflow in the cavity channel, and further improves the heat dissipation efficiency. Specifically, considering that a single lamination is thin, positions of the openings on a plurality of adjacent laminations are kept consistent, a cross-sectional area of a segment of the cavity channel is increased. Because the flow speed of the airflow in the cavity channel is slow due to a viscosity effect near a wall of the cavity channel, the increased cross-sectional area is beneficial for increasing the flow speed of the airflow in the segment of the cavity channel. For example, the lamination unit of the stator in this embodiment is used, and the iron core may be obtained by stacking n types of laminations as one cycle. A number of pieces of each type of lamination is more, where n is an integer greater than or equal to 2.

Optionally, in the axial direction of the stator, projections of the hole portions that are formed in each lamination included in the lamination unit and that are suitable for forming the same cavity channel deflect clockwise or anticlockwise in the axial direction of the stator. Therefore, the cavity channel rotationally extends in the circumferential direction of the stator while extending toward the interior of the iron core in the axial direction of the stator. This helps increase the length of the cavity channel extending inside the iron core in a meandering manner, to optimize a heat dissipation effect, and improve balance of heat dissipation at various positions of the iron core.

Optionally, for lamination units other than first and last lamination units among the plurality of lamination units, hole portions formed in the first and last laminations in the lamination unit are in communication with edges of respective laminations where the hole portions are located. In this way, it is ensured that the inlet and the outlet of the cavity channel of the lamination unit located in the middle are reliably in communication with the outside of the iron core, to provide a channel for gas convection.

Optionally, a number of the plurality of laminations included in the lamination unit is related to a size of hole portions formed in each lamination and an overlapping area of hole portions formed in adjacent laminations in the axial direction of the stator. Therefore, a number of laminations included in a minimum repeating unit is properly designed according to a size of an opening on each lamination and an overlapping degree of openings on adjacent laminations. This helps arrange as many cavity channels as possible by using a space on the iron core to a maximum extent, to obtain a better heat dissipation effect.

Optionally, the at least one cavity channel includes at least one channel group arranged in a circumferential direction of the stator, where each channel group includes at least one first channel arranged in the axial direction of the stator. Therefore, at least one channel group is distributed along the circumferential direction of the stator, and a first channel in each channel group penetrates through at least a part of the iron core along the axial direction of the stator, so that heat inside the iron core can naturally flow from a lower inlet of each first channel to an upper outlet along the first channel, thereby quickly dissipating heat to the outside of the iron core. Further, for each channel group, a plurality of independent first channels are provided, so that numbers of inlets and outlets can be increased, and the heat dissipation surface area inside the iron core may further be increased, to better improve the heat dissipation performance.

Optionally, the at least one channel group includes a first channel group and a second channel group, and in the axial direction of the stator, the second channel group and the first channel group have a height difference. The outlet in communication with each first channel in the first channel group and the inlet in communication with each first channel in the second channel group are located on an outer surface of the same side of the lamination unit. In this way, an airflow enters the second channel group through the first channel group and then is finally discharged out of the motor, to increase the length of the cavity channel through which the airflow flows inside the iron core as a whole, and bring more heat out of the iron core as much as possible, thereby further enhancing the heat dissipation effect.

Optionally, the cavity channel further includes second channels, and at least some adjacent first channels of the plurality of first channels are in communication with each other through the second channels. In this way, the heat dissipation surface area inside the iron core may be further increased, to optimize the heat dissipation effect.

Therefore, an embodiment of the present invention further provides a motor, including the stator. In this embodiment, the stator with a better heat dissipation effect is used, so that the motor has less a less power consumption loss and a higher power density.

Therefore, an embodiment of the present invention further provides a household appliance, including: a housing; and the motor, arranged in the housing. In this embodiment, a stator with a better heat dissipation effect is used, so that a motor arranged in the household appliance has less a less power consumption loss and a higher power density. This helps reduce overall power consumption of the household appliance, and better meet an energy-saving environmental requirement.

Other features which are considered as characteristic for the invention are set forth in the appended claims.

Although the invention is illustrated and described herein as embodied in a stator for motor, motor, and household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

To make the foregoing objectives, features, and advantages of the present invention clearer and easier to understand, specific embodiments of the present invention are described in detail below with reference to the accompanying drawings.

Figure 1:
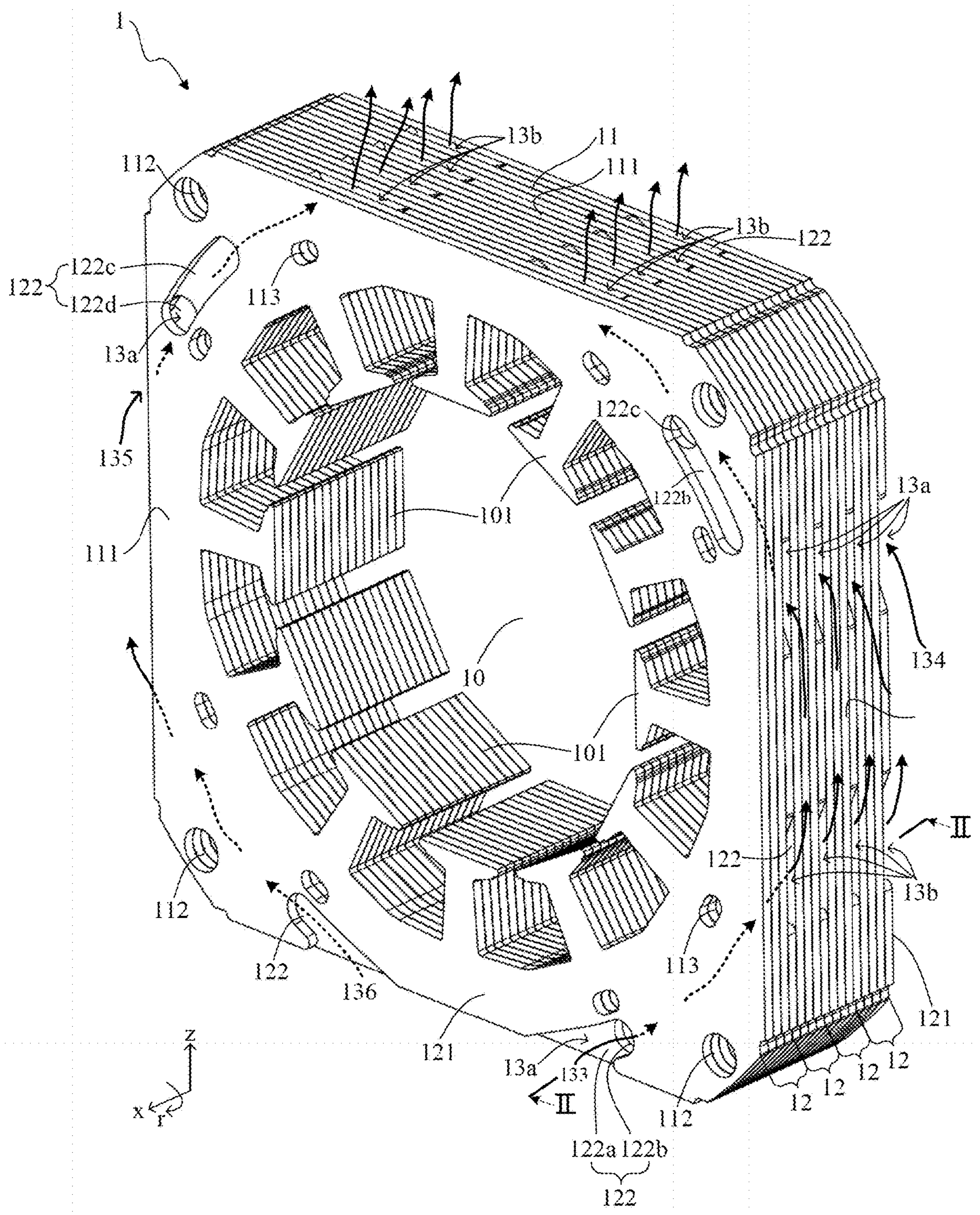
FIG. 1 is a diagrammatic, perspective view of a stator for a motor according to a first embodiment of the present invention.
Figure 2:
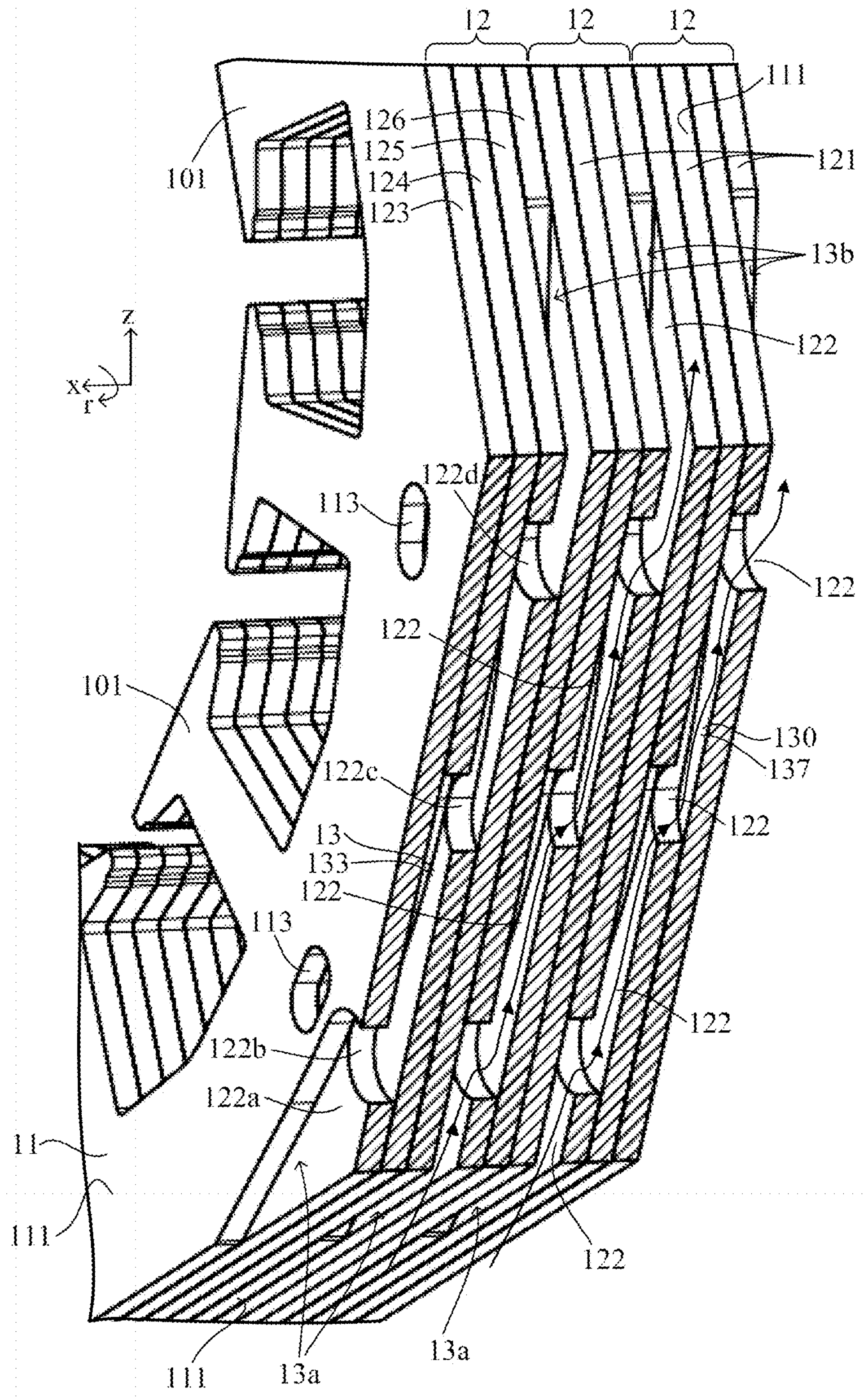
FIG. 2 is a perspective, sectional view taken along a the line II-II shown in FIG. 1.

Referring now to the figures of the drawings in detail and first, particularly to FIG. 1 thereof, there is shown a schematic diagram of a stator 1 for a motor according to a first embodiment of the present invention. FIG. 2 is a sectional view of FIG. 1 taken along the II-II direction line. To show a specific structure of a cavity channel 13 inside the stator 1 more clearly, FIG. 2 exemplarily illustrates a region of a cross section.

Specifically, a motor (not shown) may include the stator 1 and a casing (which is not shown and may also be referred to as a base), where the casing is adapted to fix and protect the stator 1. For example, the casing may include end caps arranged on two sides of the stator 1 in an axial direction of the stator 1. Further, a wire package (which is not shown and may also be referred to as a coil) may be wound on the stator 1 to form a stator winding.

For ease of description, in this embodiment, an axial direction of the stator 1 is denoted as an x-direction, a circumferential direction is denoted as an r-direction, and a height direction is denoted as a z-direction. In this embodiment, the height direction of the stator 1 may be parallel to a gravity direction when the stator 1 is stably placed. The stable placement may specifically refer to a placement status when the motor is in operation. In this embodiment, the axial direction (for example, the x-direction) and the circumferential direction (for example, the r-direction) of the stator 1 may be respectively parallel to an axial direction and a circumferential direction of a through hole 10 formed in the stator 1 and configured to accommodate a rotor.

For example, a plurality of teeth 101 are arranged around the through hole 10 at intervals, where each tooth 101 may be wound with a coil to form the stator.

Specifically, still referring to FIG. 1, the stator 1 for a motor in this embodiment includes an iron core 11, which is also referred to as an iron core of the stator or a stator core. For example, the iron core 11 is provided with a through hole 10, and the plurality of teeth 101 are arranged around the through hole 10. In some embodiments, the iron core 11 may be obtained by stacking a plurality of laminations 121 in the x-direction.

Figure 3:
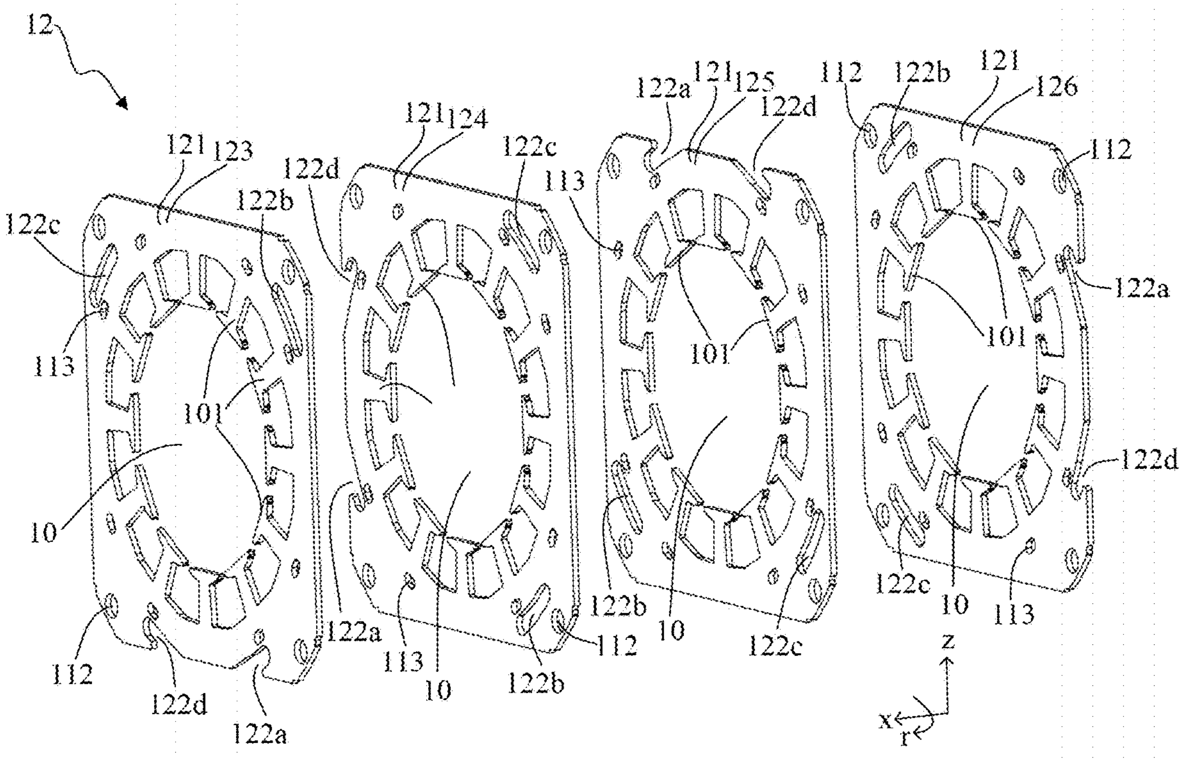
FIG. 3 is an exploded, perspective view of a lamination unit in FIG. 1.

Further, with reference to FIG. 1 to FIG. 4, the iron core 11 includes at least one lamination unit 12 arranged in the axial direction of the stator 1 (for example, the x-direction). Referring to FIG. 3, for each lamination unit 12, the lamination unit 12 includes a plurality of laminations 121 arranged in the x-direction. The lamination unit 12 may be understood as a minimum repeating unit of the iron core 11. A single lamination unit 12 may form the iron core 11, or a plurality of lamination units 12 may be sequentially arranged in the x-direction to form the iron core 11. Adjacent lamination units 12 may be closely attached. In some embodiments, the lamination 121 may be, for example, a silicon steel sheet.

Further, still referring to FIG. 1 and FIG. 2, the stator 1 further includes at least one cavity channel 13, formed inside the lamination unit 12, where an inlet 13*a* and an outlet 13*b* that are in communication with each cavity channel 13 are respectively provided on outer surfaces of the lamination unit 12. In other words, for each cavity channel 13, an inlet 13*a* and an outlet 13*b* that are in communication with the cavity channel 13 are respectively provided on the outer surfaces of the lamination unit 12, to ensure that air can enter the cavity channel 13 through the inlet 13*a*, and flow to the outlet 13*b* along the cavity channel 13 and finally flow out of the iron core 11. FIG. 1 exemplarily shows a flow path of gas in a cavity channel 13 by using a curve with a solid arrow.

In this embodiment, the inlet 13*a* and the outlet 13*b* are determined according to a placement posture of the stator 1. Specifically, based on a current placement posture of the stator 1, when the motor is in operation, a gas inlet is the inlet 13*a*, and a gas outlet is the outlet 13*b*. If a placement direction of the stator 1 changes, positions of the inlet 13*a* and the outlet 13*b* in a vertical direction change. For example, after the stator 1 shown in FIG. 1 rotates clockwise by 90 degrees about an axis extending in the x-direction, the outlet 13*b* originally marked in the figure is located below the inlet 13*a*. Further, in this case, the original outlet 13*b* may become the inlet 13*a*, and the original inlet 13*a* may become the outlet 13*b*.

Further, an outer surface of the at least one lamination unit 12 may jointly form an outer surface 111 of the iron core 11.

Further, the outlet 13*b* and the inlet 13*a* have a height difference in the axial direction of the stator 1 (for example, the x-direction). For example, openings in communication with the outside of the iron core 11 are provided at two ends of the cavity channel 13 in an extension direction. When the stator 1 is stably placed, a lower opening in the z-direction is the inlet 13*a*, and an upper opening is the outlet 13*b*.

Further, an extension path of the cavity channel 13 from the inlet 13*a* to the outlet 13*b* may extend in the x-direction and in the z-direction in a meandering manner. For example, still referring to FIG. 1, cavity channels 13 distributed in different regions of the stator 1 in the r-direction are respectively denoted as a first cavity channel 133, a second cavity channel 134, a third cavity channel 135, and a fourth cavity channel 136. Flow paths of gas along the cavity channels 13 are respectively shown in the figure (marked by reference numerals of corresponding cavity channels in the figure).

In this way, heat dissipation performance of the stator 1 can be improved, thereby reducing a temperature of the motor and improving efficiency and a power density of the motor. Specifically, the cavity channel 13 of a three-dimensional spatial structure is formed inside the iron core 11 of the stator 1, to increase a heat-dissipation surface area of the lamination 121. Further, there is a height difference between the inlet 13*a* and the outlet 13*b* of the cavity channel 13 in the axial direction of the stator 1, so that air convection is formed. When an airflow flows along the cavity channel 13, the airflow takes away heat generated in the iron core 11. In this way, heat can be directly dissipated from a heat source to the air, thereby further improving heat dissipation efficiency. The stator 1 with better heat dissipation performance can reduce the overall temperature of the motor, and improve the efficiency and a power density, for example, a maximum output capability of the motor.

Further, natural convection is achieved in the cavity channel 13 by using a self-pulling force of the hot air during rise. An airflow naturally flows in the cavity channel 13 without additionally arranging a driving mechanism to perform air evacuation, thereby improving the heat dissipation efficiency.

When the motor is in operation and the stator 1 generates heat, heat on the stator winding is transferred to the iron core 11, air in the cavity channel 13 is heated and then takes away heat while flowing along the cavity channel 13 from bottom to top, and cold air is automatically added from the bottom. Compared to a heat-dissipation surface area of a conventional iron core of a stator, a surface area of an interior of each of the plurality of cavity channels 13 is greatly increased, thereby greatly improving the heat dissipation efficiency. Therefore, the stator 1 in this embodiment can greatly reduce the temperature of the motor, thereby reducing energy consumption of the motor, improving efficiency, and increasing power density of the motor, so that the motor with the same size has higher output.

In some embodiments, the inlet 13*a* and the outlet 13*b* may be formed on outer surfaces of the lamination unit 12 that are not covered by the casing.

In some embodiments, the plurality of cavity channels 13 may be independent, where each cavity channel 13 is provided with a respective inlet 13*a* and outlet 13*b* on outer surfaces of the lamination unit 12.

In a specific implementation, still referring to FIG. 1 and FIG. 2, an inlet 13*a* and an outlet 13*b* that are in communication with the same cavity channel 13 may be respectively arranged on outer surfaces on different sides of the lamination unit 12.

Specifically, for the same cavity channel 13, an inlet 13*a* and an outlet 13*b* of the cavity channel 13 may be respectively provided on outer surfaces on adjacent sides of the lamination unit 12. Correspondingly, the extension path of the cavity channel 13 inside the iron core 11 extends from one side of the iron core 11 to the other adjacent side.

Figure 6:
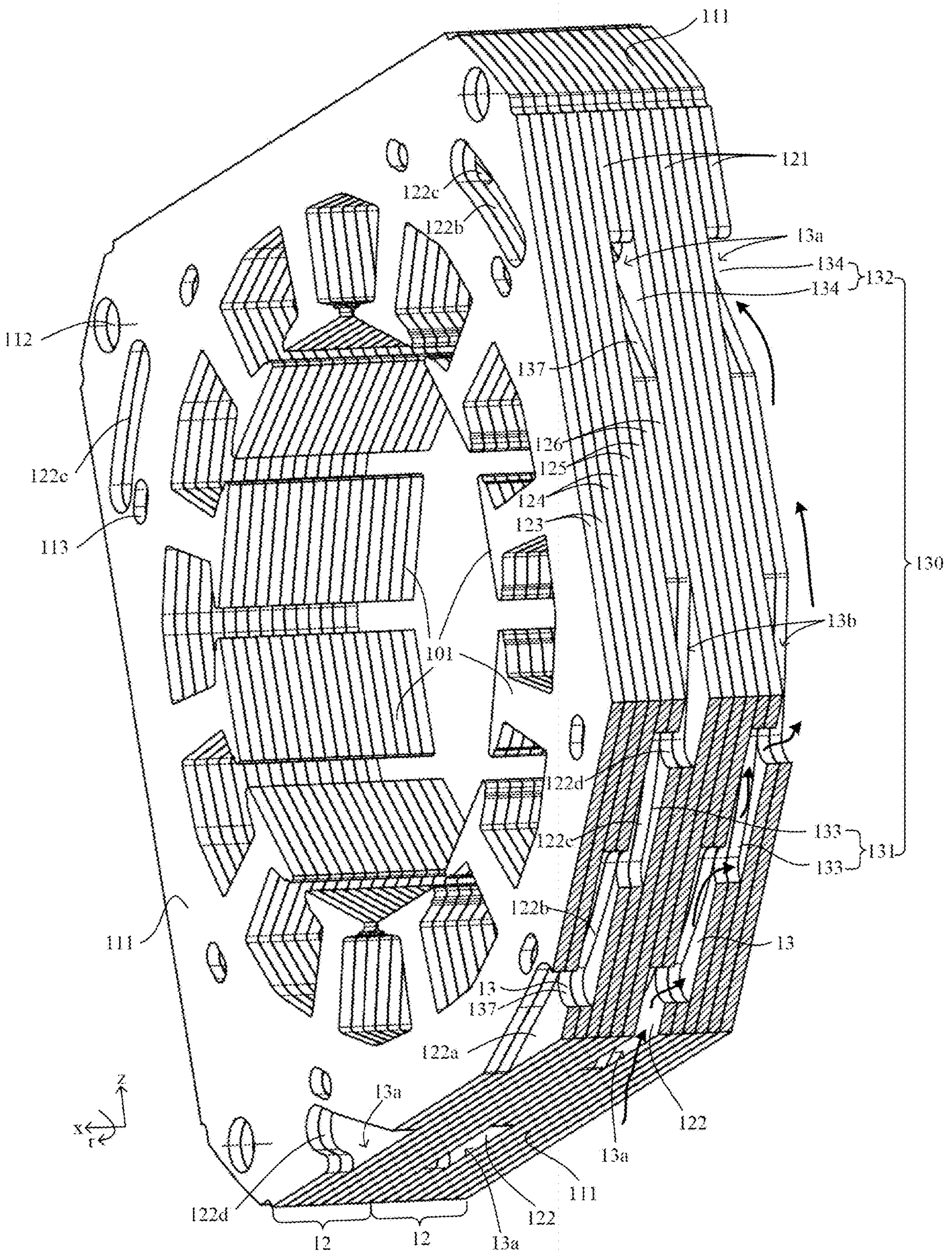
FIG. 6 is a perspective, sectional view taken along the line V-V shown in FIG. 5.

For example, from the perspective shown in FIG. 1 and FIG. 2, a plurality of cavity channels 13 are arranged in the iron core 11. Some cavity channels 13 (for example, a plurality of cavity channels 13 in a first channel group 131, as shown in FIG. 6) are arranged in the x-direction, where an inlet 13*a* of each cavity channel 13 is located on a lower side of the iron core 11, and an outlet 13*b* is located on a right side of the iron core 11 from the perspective shown in the figure. Some other cavity channels 13 (for example, a plurality of cavity channels 13 in a second channel group 132, as shown in FIG. 6) are arranged in the x-direction and are completely located above the first channel group 131, where an inlet 13*a* of each cavity channel 13 is located on a right side of the iron core 11 from the perspective shown in the figure, and an outlet 13*b* is located on an upper side of the iron core 11.

Therefore, a length of the cavity channel 13 meandered inside the iron core 11 may be increased, to increase the heat dissipation surface area, thereby further facilitating heat dissipation.

In some embodiments, when it is ensured that there is a height difference in the x-direction, an inlet 13*a* and an outlet 13*b* of the same cavity channel 13 are respectively provided on two opposite sides of the lamination unit 12.

In some embodiments, the inlet 13*a* and the outlet 13*b* of the same cavity channel 13 may not be on the same plane, where the plane is perpendicular to the x-direction. Therefore, the cavity channel 13 extends at least a distance inside the iron core 11 in the x-direction, to ensure that heat inside the iron core 11 is quickly dissipated through the cavity channel 13.

Specifically, the inlet 13*a* and the outlet 13*b* may be provided on different laminations 121 of the lamination unit 12, so that the cavity channel 13 extends in the x-direction.

In a specific implementation, still referring to FIG. 1 to FIG. 4, the lamination unit 12 may include a plurality of laminations 121, where a hole portion 122 may be formed in each lamination 121, and the hole portion 122 is suitable for forming a part of the cavity channel 13.

Specifically, the hole portion 122 may run through the lamination 121 in the x-direction. Correspondingly, a wall of the lamination 121 that forms the hole portion 122 is a part of the cavity channel 13.

Further, a hole portion 122 formed in the at least one lamination 121 may extend to an edge of the lamination 121, to form an inlet 13*a* or an outlet 13*b*. In this case, the hole portion 122 may also be understood as a notch.

Therefore, the cavity channel 13 may be formed in the iron core 11 by using a simple lamination process. A production process is simple and easy to implement, and manufacturing costs are low. Further, openings are provided at appropriate positions on each lamination 121 to form the hole portion 122, and after the plurality of laminations 121 are finally stacked, a channel of a spatial structure may be formed in the iron core 11 of the stator 1 to facilitate heat dissipation.

In some embodiments, still referring to FIG. 2, a larger thickness of the lamination 121 in the x-direction indicates a larger cross-sectional area of the part of the cavity channel 13 formed by the openings on the lamination 121.

In some embodiments, a larger aperture of the hole portion 122 indicates a larger cross-sectional area of the part of the cavity channel 13 formed by the hole portion 122.

In some embodiments, shapes and structures of the laminations 121 may be the same or different, so that the design of the cavity channel 13 in this embodiment can be flexibly adapted to the iron core 11 of the stator 1 of various structural designs.

For example, four laminations 121 of different designs may be stacked in the x-direction to form one lamination unit 12. A notch (that is, a hole portion 122 extending to an edge of the first lamination 121) is sequentially provided below a surface of the first lamination 121 in the x-direction, a hole portion 122 is provided on the second lamination 121 and the notch on the first lamination 121 is in communication with an opening on the second lamination 121 in the x-direction, a hole portion 122 is provided on the third lamination 121 and a front end of an opening is in communication with a tail end of the opening on the second lamination 121 in the x-direction, and a notch extending to a side surface is provided on the fourth lamination 121 and an end of the notch is in communication with a tail end of the opening on the third lamination 121. In this way, every four laminations 121 may form a through channel (that is, a cavity channel 13) of a spatial structure, inlets 13*a* of the cavity channel 13 are formed on a front surface and a lower side of the lamination unit 12 through the notch of the first lamination 121, and outlets 13*b* of the cavity channel 13 are formed on side surfaces of the lamination unit 12 through the notch of the fourth lamination 121.

In a specific implementation, still referring to FIG. 1 to FIG. 4, the lamination unit 12 may include a plurality of laminations 121 in the same shape, where the plurality of laminations 121 sequentially rotate by a preset angle to stack into the lamination unit 12, a plurality of hole portions 122 arranged in a circumferential direction of the stator 1 (for example, the r-direction) may be formed in each lamination 121, and a plurality of hole portions 122 respectively formed in every two adjacent laminations 121 are penetrated in the axial direction of the stator 1 (for example, the x-direction), to form a plurality of cavity channels 13.

Specifically, a specific value of the preset angle may be determined based on an included angle (or a spacing) between adjacent hole portions 122 on a single lamination 121.

For example, in the figure, a square-shaped lamination 121 is used as an example for exemplary illustration. Hole portions 122 are symmetrically arranged at four corners of the square-shaped lamination 121, and correspondingly, the preset angle may be 90 degrees. In other words, a plurality of laminations 121 of the same design are stacked one by one and rotate clockwise/counterclockwise by 90 degrees, to finally obtain the lamination unit 12 through one-by-one stacking. FIG. 3 exemplarily shows an example in which a lamination unit 12 is obtained by rotating a lamination clockwise by 90 degrees each time the lamination is stacked.

In another example, an outer profile of the lamination 121 may be circular, and the plurality of hole portions 122 may be arranged around the through hole 10 at equal intervals in the r-direction. In this case, the preset angle may be less than a deflection angle of the adjacent hole portions 122 relative to an axis of the through hole 10. Therefore, the plurality of laminations 121 with the same opening layout are rotated and stacked, so that the iron core 11 of the stator 1 with the plurality of cavity channels 13 is manufactured, and the manufacturing process is simple and costs are low. Specifically, a channel of a spatial structure is formed on the iron core 11 of the stator 1 after the plurality of laminations 121 of the same design are rotated by an angle, to facilitate heat dissipation. Because opening layouts of the openings on laminations 121 are the same, the entire iron core 11 can be produced by developing a single mold. This reduces opening costs and process complexity.

In some embodiments, all the hole portions 122 formed on the single lamination 121 are at equal distances from the axis of the through hole 10. In other words, a pattern enclosed by all hole portions 122 on the lamination 121 is a circle, and may be a concentric circle with the through hole 10.

In some embodiments, a pattern enclosed by all the hole portions 122 formed on the single lamination 121 may be a plurality of concentric circles with the through hole 10. For example, based on the fact that one hole portion 122 is provided at each of the four corners of the square-shaped lamination 121 shown in FIG. 1, a hole portion 122 may be additionally arranged on an outer side of each hole portion 122 in a radial direction of the through hole 10. In this way, layouts of the plurality of hole portions 122 on the lamination 121 and the through hole 10 jointly form three concentric circles.

Figure 5:
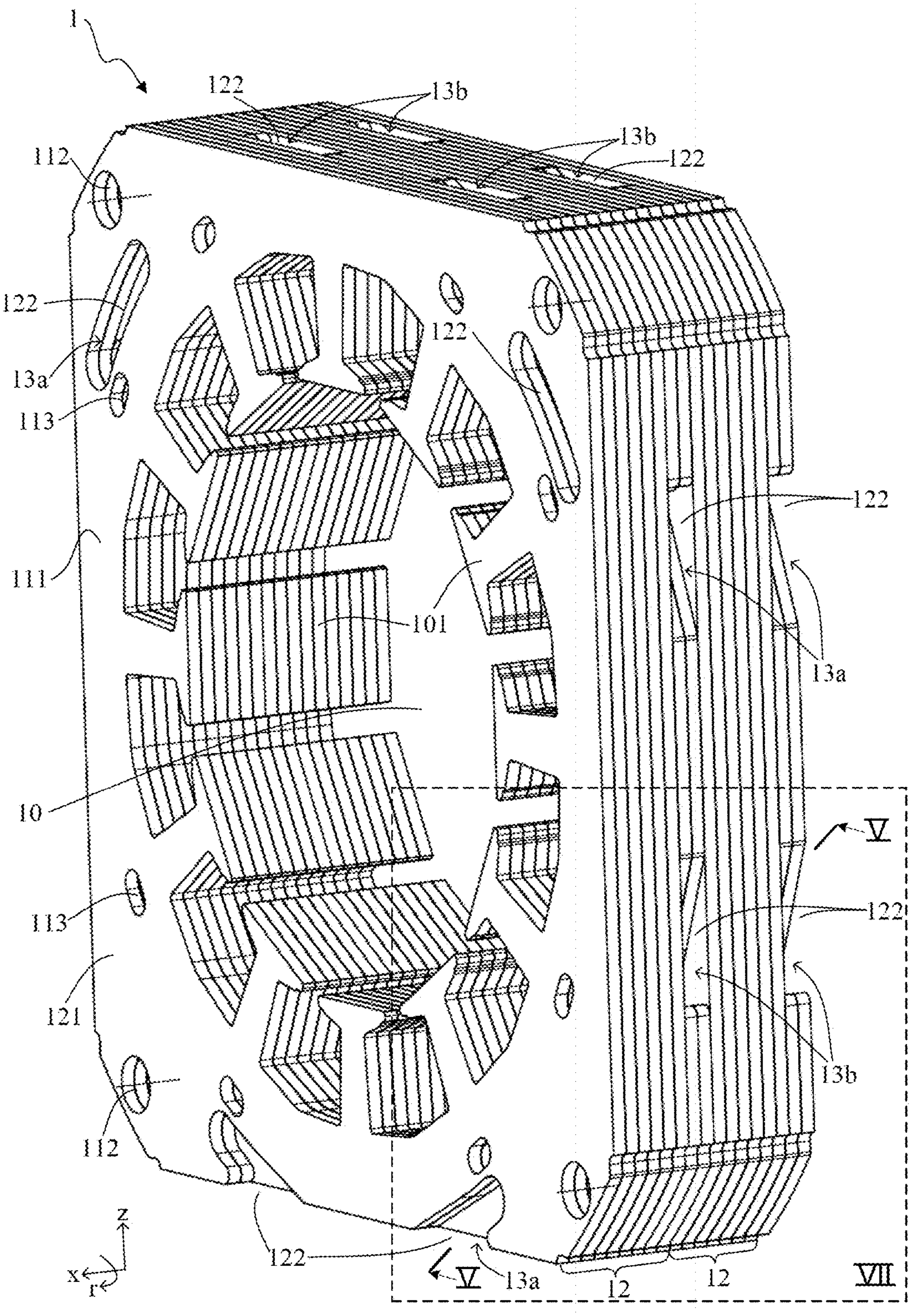
FIG. 5 is a perspective view of the stator according to a variant embodiment of the embodiment shown in FIG. 1.
Figure 7:
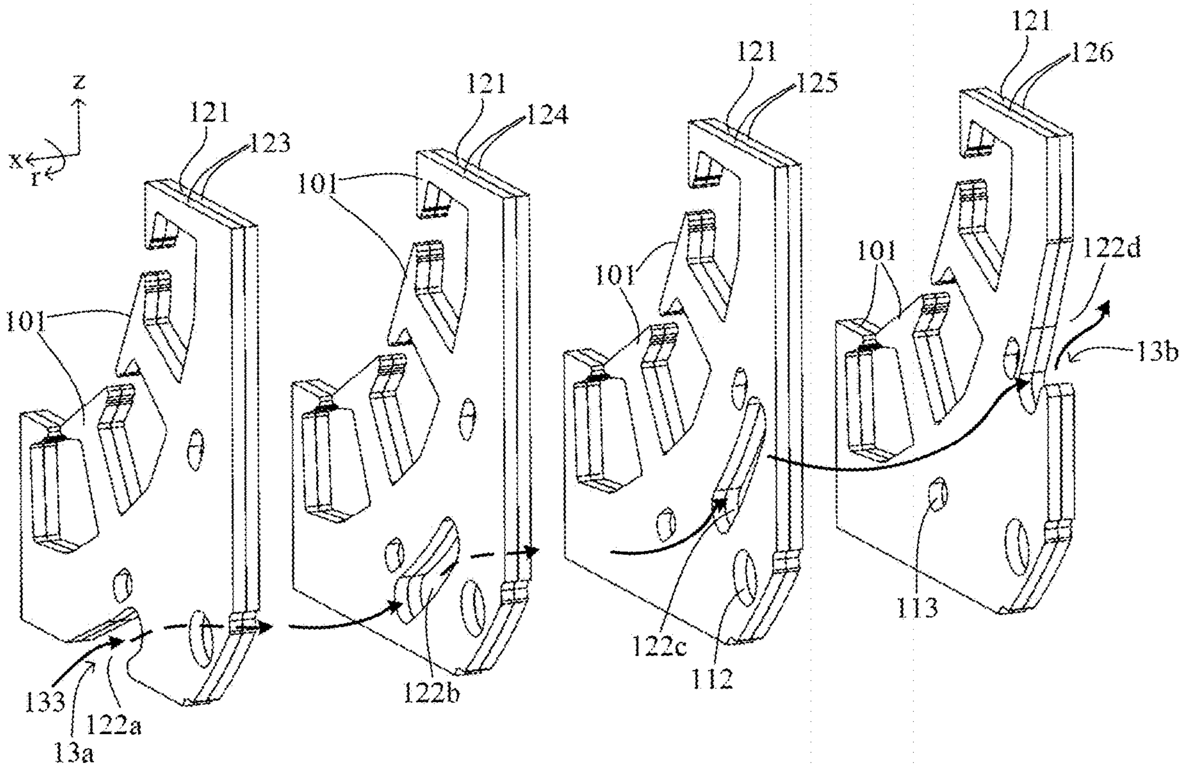
FIG. 7 is a partial exploded view of the lamination unit shown in region VII of FIG. 5.
Figure 8:
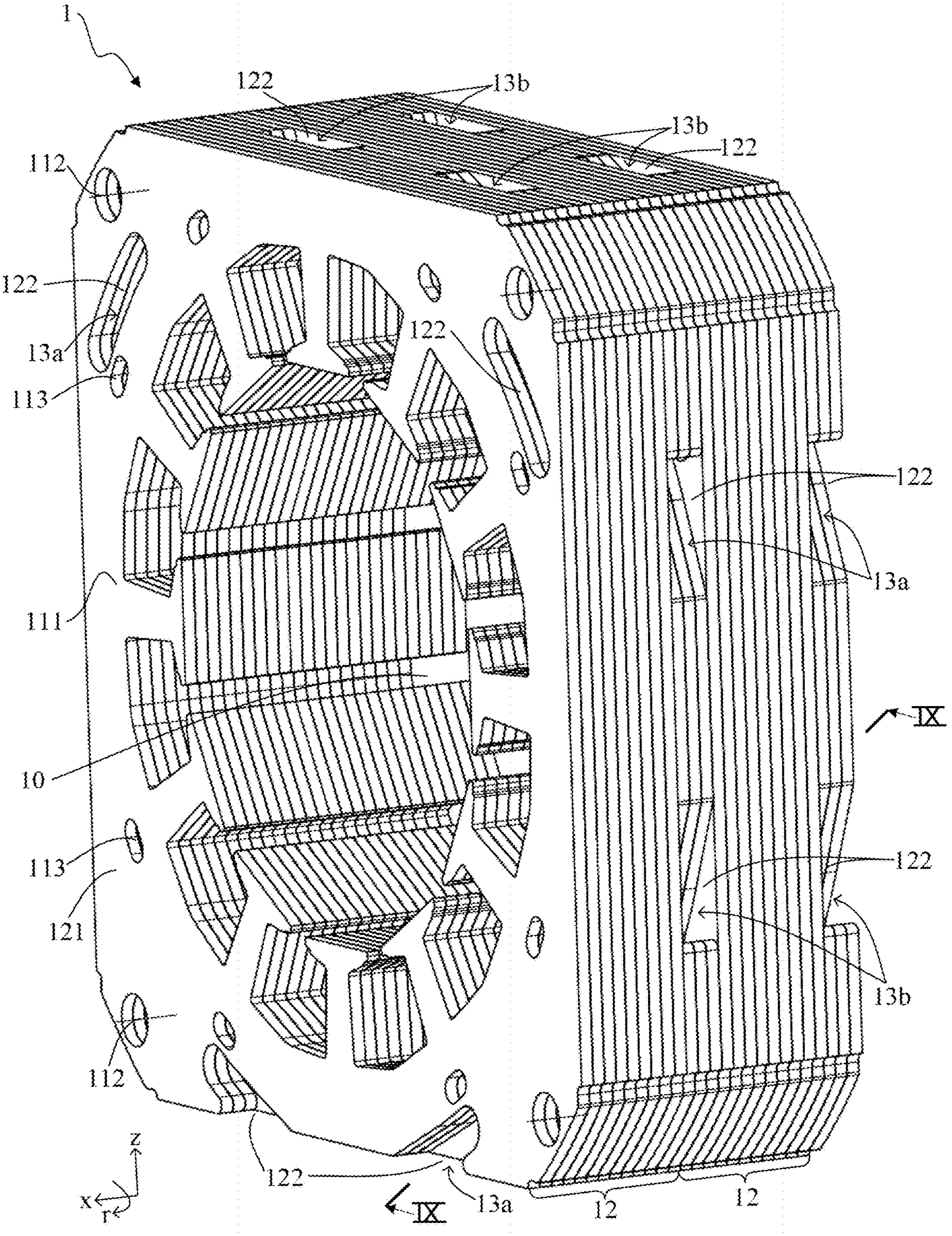
FIG. 8 is a diagram perspective view of the stator according to another variant embodiment of the embodiment shown in FIG. 1.
Figure 9:
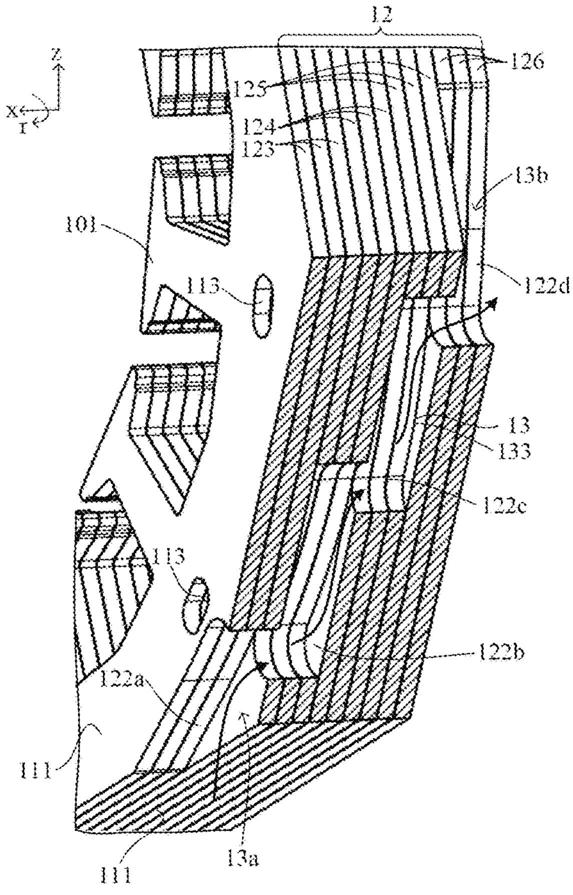
FIG. 9 is a perspective, sectional view of taken along the line IX-IX shown in FIG. 8.
Figure 10:
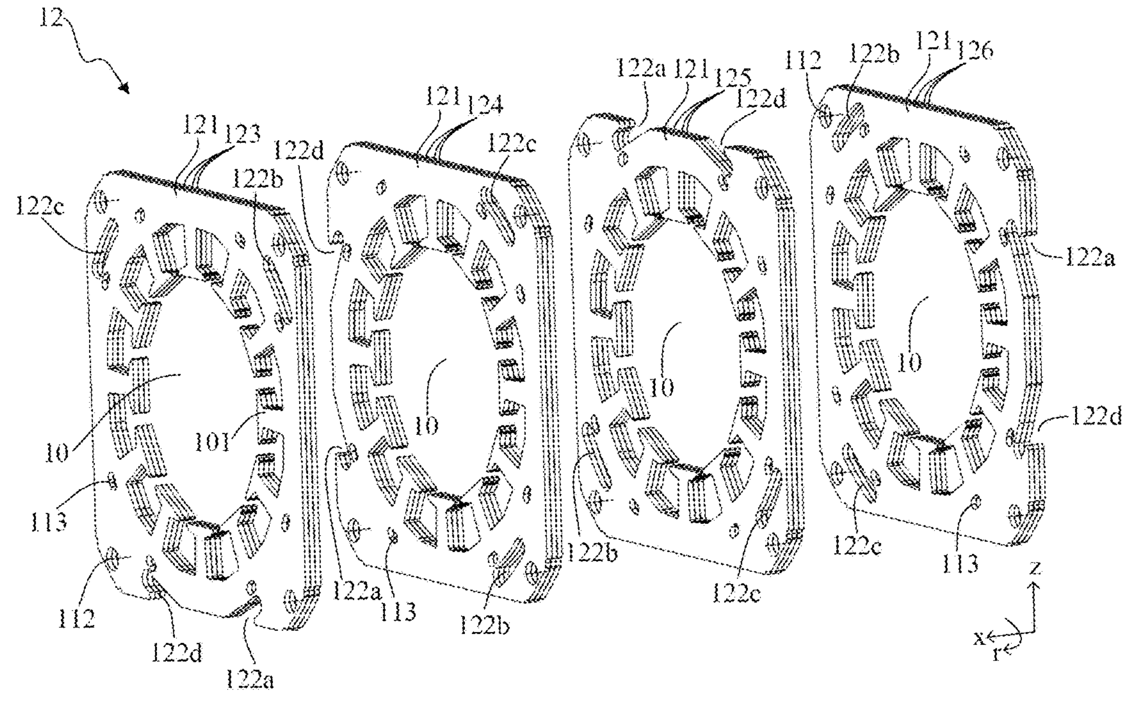
FIG. 10 is an exploded view of the lamination unit shown in FIG. 8.

In this embodiment, the iron core 11 may be obtained by stacking n types of laminations 121 as one cycle, where n is an integer greater than or equal to 2. A single cycle is a minimum repeating unit, that is, the single cycle corresponds to a single lamination unit 12. For example, variant embodiments shown in FIG. 5 to FIG. 7 are exemplarily illustrated by using n=2 as an example, and variant embodiments shown in FIG. 8 to FIG. 10 are exemplarily illustrated by using n=3 as an example.

Further, a number of pieces of each type of lamination 121 in the single lamination unit 12 may be one, as shown in FIG. 1 to FIG. 4. Alternatively, a number of pieces of each type of lamination 121 in the single lamination unit 12 may be more, as shown in FIG. 5 to FIG. 10. In a variant embodiment, a number of pieces of at least one type of lamination 121 in the single lamination unit 12 may be different from a number of pieces of another type of lamination 121.

Further, for n types of laminations 121 in each lamination unit 12, a difference between different types of laminations 121 specifically lies in that there is a difference in positions/layouts of openings (for example, hole portions 122 of different types of laminations 121 in the x-direction are not completely in communication). The difference in the positions/layouts of the openings may be implemented through laminations 121 of different structural designs, or may be implemented by rotating laminations 121 of the same structural design by a preset angle.

In a specific implementation, still referring to FIG. 2 and FIG. 3, the lamination unit 12 may include a first lamination 123, a second lamination 124, a third lamination 125, and a fourth lamination 126 that are sequentially arranged in the axial direction of the stator 1 (for example, the x-direction). Specifically, two adjacent laminations 121 may be in surface-to-surface contact.

Figure 4:
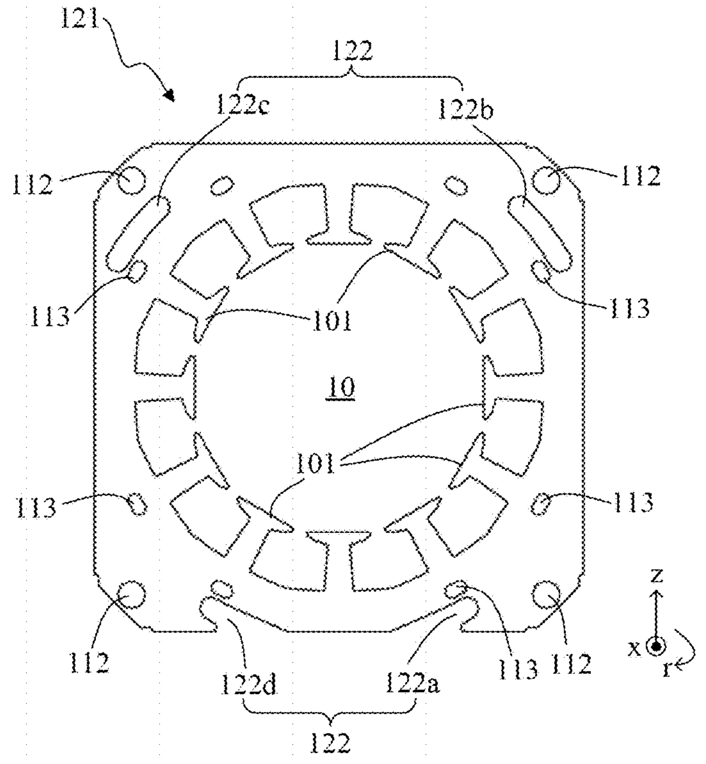
FIG. 4 is a from view of the lamination in FIG. 1.

Further, referring to FIG. 4, each lamination 121 is provided with a first hole 122*a*, a second hole 122*b*, a third hole 122*c*, and a fourth hole 122*d* that are sequentially arranged in the circumferential direction of the stator 1 (for example, the r-direction). For example, the first hole 122*a*, the second hole 122*b*, the third hole 122*c*, and the fourth hole 122*d* are arranged at equal intervals around the axis of the through hole 10. The arrangement at equal intervals may be, for example, that the hole portions 122 are arranged at intervals of 90 degrees. Further, the first hole 122*a* and the fourth hole 122*d* may each extend to an edge of the same side of the lamination 121.

Further, with reference to FIG. 1, the at least one cavity channel 13 may include a first cavity channel 133, a second cavity channel 134, a third cavity channel 135, and a fourth cavity channel 136. For example, four cavity channels 13 are distributed around the through hole 10 in the r-direction, and extend through the lamination unit 12 in the x-direction.

In a variant embodiment in which n=2 shown in FIG. 6, the first lamination 123, the second lamination 124, the third lamination 125, and the fourth lamination 126 may each include two laminations 121. In a variant embodiment in which n=3 shown in FIG. 9, the first lamination 123, the second lamination 124, the third lamination 125, and the fourth lamination 126 may each include three laminations 121.

In some embodiments, every two of the first hole 122*a* of the first lamination 123, the second hole 122*b* of the second lamination 124, the third hole 122*c* of the third lamination 125, and the fourth hole 122*d* of the fourth lamination 126 are penetrated in the axial direction of the stator 1 (for example, the x-direction), to form the first cavity channel 133. From a perspective shown in the figure, the first cavity channel 133 is located at a lower right corner of the lamination unit 12, where an inlet 13*a* is provided at a lower side and a front surface of the lamination unit 12, and an outlet 13*b* is provided at a right-side surface of the lamination unit 12. Further, the inlet 13*a* on a lower side and the outlet 13*b* on an upper side of the first cavity channel 133 are located on different laminations 121. For example, the inlet 13*a* and the outlet 13*b* are respectively located on the first lamination 123 and the fourth lamination 126.

Similarly, every two of the second hole 122*b* of the first lamination 123, the third hole 122*c* of the second lamination 124, and the fourth hole 122*d* of the third lamination 125 are penetrated in the axial direction of the stator 1 (for example, the x-direction), to form the second cavity channel 134. From a perspective shown in the figure, the second cavity channel 134 may be located at an upper right corner of the lamination unit 12, where an inlet 13*a* of the second cavity channel 134 is provided on a front surface of the lamination unit 12 (where the second hole 122*b* of the first lamination 123 is reused) and is located above the outlet 13*b* of the first cavity channel 133, and an outlet 13*b* of the second cavity channel 134 may be provided above the lamination unit 12 (where the fourth hole 122*d* of the third lamination 125 is reused).

Similarly, each of the third hole 122*c* of the first lamination 123 and the fourth hole 122*d* of the second lamination 124, and the first hole 122*a* of the third lamination 125 and the second hole 122*b* of the fourth lamination 126 may be in communication in the axial direction of the stator 1 (for example, the x-direction), to form two third cavity channels 135. From a perspective shown in the figure, the two third cavity channels 135 are each located at an upper left corner of the lamination unit 12 and arranged from front to back in the x-direction. An inlet 13*a* of the front third cavity channel 135 is provided on a left side surface of the lamination unit 12 (where the fourth hole 122*d* of the second lamination 124 is reused) and is located above an outlet 13*b* of the fourth cavity channel 136 that is also provided on the left side surface. An outlet 13*b* of the front third cavity channel 135 may be provided on a front surface of the lamination unit 12 (where the third hole 122*c* of the first lamination 123 is reused). An inlet 13*a* of the rear third cavity channel 135 is provided on a rear surface of the lamination unit 12 (where the second hole 122*b* of the fourth lamination 126 is reused) and is located above an outlet 13*b* of the fourth cavity channel 136. An outlet 13*b* of the rear third cavity channel 135 may be provided above the lamination unit 12 (where the first hole 122*a* of the third lamination 125 is reused).

Similarly, every two of the first hole 122*a* of the second lamination 124, the second hole 122*b* of the third lamination 125, and the third hole 122*c* of the fourth lamination 126 are penetrated in the axial direction of the stator 1 (for example, the x-direction), to form the fourth cavity channel 136. From a perspective shown in the figure, the fourth cavity channel 136 may be located at a lower left corner of the lamination unit 12, where an inlet 13*a* is provided on the rear surface of the lamination unit 12 (where the third hole 122*c* of the fourth lamination 126 is reused), and an outlet 13*b* is formed on the left side surface of the lamination unit 12 (where the first hole 122*a* of the second lamination 124 is reused).

Therefore, the single lamination unit 12 has four cavity channels 13 distributed in the circumferential direction of the stator 1, and each cavity channel 13 penetrates through at least a part of the interior of the lamination unit 12 in the axial direction of the stator 1, so that heat inside the iron core 11 can naturally flow from the inlet 13*a* on the lower side to the outlet 13*b* on the upper side/side surface along the cavity channel 13, and the heat is quickly dissipated to the outside of the iron core 11.

Further, the iron core 11 obtained by arranging the plurality of lamination units 12 in the x-direction is provided with inlets 13*a* and outlets 13*b* of the cavity channel 13 on four sides (for example, upper and lower and left and right sides from the perspective shown in the figure) in the circumferential direction (for example, the r-direction). In this way, an airflow can flow more omnidirectionally inside the iron core 11 to quickly take away heat inside the iron core 11. In addition, when the iron core 11 is placed in any posture, an inlet 13*a* and an outlet 13*b* that are adapted to be provided on side surfaces form a cavity channel 13 in communication with the outside, to achieve heat dissipation.

In some embodiments, adjacent lamination units 12 may jointly form the cavity channel 13. This helps increase a length of the cavity channel 13 extending in the iron core 11, and further improve heat dissipation performance.

For example, still referring to FIG. 3, for two adjacent lamination units 12 in the x-direction, the first hole 122*a* of the fourth lamination 126 in the front lamination unit 12 may form the second cavity channel 134 together with the second hole 122*b* of the first lamination 123, the third hole 122*c* of the second lamination 124, and the fourth hole 122*d* of the third lamination 125 in the rear lamination unit 12. Therefore, a longer second cavity channel 134 facilitates better heat dissipation.

Further, in this example, the inlet 13*a* of the second cavity channel 134 may reuse the first hole 122*a* of the fourth lamination 126 in the front lamination unit 12. In other words, the inlet 13*a* of the second cavity channel 134 may be provided on a right side of the iron core 11 from the perspective shown in the figure, and is located above the outlet 13*b* of the first cavity channel 133 that is also provided on the right side. Therefore, gas flowing out of first cavity channels 133 of the two adjacent lamination units 12 may enter the iron core 11 again through the inlet 13*a* of the second cavity channel 134. This helps increase a path through which the airflow flows in the iron core 11, thereby improving heat dissipation efficiency.

In another example, for the two adjacent lamination units 12 in the x-direction, the fourth hole **122*d* of the second lamination 124 and the third hole 122*c* of the first lamination 123 in the rear lamination unit 12 may form the third cavity channel 135 together with the second hole 122*b* of the fourth lamination 126 and the first hole 122*a* of the third lamination 125 in the front lamination unit 12. Therefore, compared with the third cavity channel 135 formed by the hole portions 122 on the two laminations 121 in the foregoing embodiment, the third cavity channel 135 jointly formed by the four laminations 121 in this example is longer, and more heat inside the iron core 11** can be taken away.

Further, in this example, the inlet **13*a* of the third cavity channel 135 may reuse the fourth hole 122*d* of the second lamination 124 in the rear lamination unit 12, and the outlet 13*b* may reuse the first hole 122*a* of the third lamination 125 in the front lamination unit 12. In other words, the inlet 13*a* of the third cavity channel 135 is provided on a left side of the iron core 11 from the perspective shown in the figure and is located above the outlet 13*b* of the fourth cavity channel 136 that is also provided on the left side, and the outlet 13*b* of the third cavity channel 135 is provided on the top of the iron core 11 from the perspective shown in the figure. Therefore, gas flowing out of fourth cavity channels 136 of the two adjacent lamination units 12 may enter the iron core 11 again through the inlet 13*a* of the third cavity channel 135. This helps increase a path through which the airflow flows in the iron core 11**, thereby improving the heat dissipation efficiency.

In another example, for two adjacent lamination units 12 in the x-direction, the fourth hole **122*d* of the first lamination 123 in the rear lamination unit 12 may form the fourth cavity channel 136 together with the first hole 122*a* of the second lamination 124, the second hole 122*b* of the third lamination 125, and the third hole 122*c* of the fourth lamination 126 in the front lamination unit 12. Therefore, a longer fourth cavity channel 136** facilitates better heat dissipation.

Further, in this example, the inlet **13*a* of the fourth cavity channel 136 may reuse the fourth hole 122*d* of the first lamination 123 in the rear lamination unit 12, and the outlet 13*b* may reuse the first hole 122*a* of the second lamination 124 in the front lamination unit 12. In other words, the inlet 13*a* of the fourth cavity channel 136 is provided on the bottom of the iron core 11 from the perspective shown in the figure, and the outlet 13*b* is provided on the left side of the iron core 11** from the perspective shown in the figure.

In a variant embodiment, sizes and positions of a first hole **122*a*, a second hole 122*b*, a third hole 122*c*, and a fourth hole 122*d* on each lamination 121 are adjusted, so that every two of a second hole 122*b* of a first lamination 123, a third hole 122*c* of a second lamination 124, a fourth hole 122*d* of the third lamination 125, and a first hole 122*a* of a fourth lamination 126 on the same lamination unit 12 may be in communication in the axial direction of the stator 1 (for example, the x-direction), to form the second cavity channel 134. Therefore, the second cavity channel 134 formed in the single lamination unit 12 fully uses hole portions 122 of all laminations 121, to maximize the length of the cavity channel 13, and increase the heat dissipation surface area inside the iron core 11**.

Similarly, sizes and positions of the first hole **122*a*, the second hole 122*b*, the third hole 122*c*, and the fourth hole 122*d* on the lamination 121 are adjusted, so that two third cavity channels 135 may be penetrated into one cavity channel from front to back. The inlet 13*a* may reuse the third hole 122*c* of the first lamination 123, and the outlet 13*b* may reuse the second hole 122*b* of the fourth lamination 126**.

In some embodiments, the casing may avoid a hole portion 122 on a front surface of the lamination 121, to block the inlet **13*a* and/or the outlet 13*b* of the cavity channel 13. For example, when the inlet 13*a* of the second cavity channel 134 is provided on the front surface of the lamination unit 12, the casing that covers two sides of the lamination unit 12 in the x-direction may avoid the second hole 122*b* of the first lamination 123, to ensure that the second cavity channel 134** is reliably in communication with the outside.

In a specific implementation, still referring to FIG. 1 to FIG. 10, for each cavity channel 13, projections of the hole portions 122 formed in the adjacent laminations 121 and suitable for forming the cavity channel 13 at least partially overlap in the axial direction of the stator 1 (for example, the x-direction).

Specifically, openings and/or notches on two adjacent laminations 121 in the x-direction at least partially overlap.

The first cavity channel 133 is used as an example. Refer to FIG. 2, FIG. 6, and FIG. 9. Projections of the first hole **122*a* of the first lamination 123 and the second hole 122*b* of the second lamination 124 in the x-direction overlap end to end, projections of the second hole 122*b* of the second lamination 124 and the third hole 122*c* of the third lamination 125 in the x-direction overlap end to end, and projections of the third hole 122*c* of the third lamination 125 and the fourth hole 122*d* of the fourth lamination 126 in the x-direction overlap end to end. The end-to-end overlapping specifically means that, in a flow direction of an airflow in the cavity channel 13, a tail end of a front hole portion 122 and a front end of a rear hole portion 122** are penetrated from front to back in the x-direction.

Therefore, it is ensured that after the plurality of laminations 121 are stacked, the front and rear hole portions 122 remain in communication, to form a through channel inside the iron core 11 of the stacked stator 1.

In a specific implementation, referring to FIG. 6 and FIG. 9, projections of hole portions 122 provided on at least two adjacent laminations 121 in the axial direction of the stator 1 (for example, the x-direction) may completely overlap.

In other words, a plurality of laminations 121 in at least one lamination unit 12 in the stator 1 may be obtained by stacking every n types of laminations 121 as one cycle. A number of pieces of each type of lamination 121 is more (that is, two or more), where n is an integer greater than or equal to 2.

For example, in variant embodiments shown in FIG. 5 to FIG. 7, a single lamination unit 12 may include two first laminations 123, two second laminations 124, two third laminations 125, and two fourth laminations 126. The two first laminations 123, the two second laminations 124, the two third laminations 125, and the two fourth laminations 126 are sequentially stacked in the x-direction.

In another example, in variant embodiments shown in FIG. 8 to FIG. 10, a single lamination unit 12 may include three first laminations 123, three second laminations 124, three third laminations 125, and three fourth laminations 126. The three first laminations 123, the three second laminations 124, the three third laminations 125, and the three fourth laminations 126 are sequentially stacked in the x-direction.

In this way, the surface area of the interior of the cavity channel 13 is larger. This increases a flow speed of an airflow in the cavity channel 13, and further improves the heat dissipation efficiency. Specifically, considering that a single lamination 121 is thin, positions of the openings on a plurality of adjacent laminations 121 are kept consistent, a cross-sectional area of a segment of the cavity channel 13 is increased. Because the flow speed of the airflow in the cavity channel 13 is slow due to a viscosity effect near a wall of the cavity channel 13, the increased cross-sectional area is beneficial for increasing the flow speed of the airflow in the segment of the cavity channel 13.

In a specific implementation, in the axial direction of the stator 1 (for example, the x-direction), projections of the hole portions 122 that are formed in each lamination 121 included in the lamination unit 12 and that are suitable for forming the same cavity channel 13 may deflect clockwise or anticlockwise in the axial direction of the stator 1.

The first cavity channel 133 is used as an example. Still refer to FIG. 3, FIG. 7, and FIG. 10. Four hole portions 122, namely, the first hole 122*a* of the first lamination 123, the second hole 122*b* of the second lamination 124, the third hole 122*c* of the third lamination 125, and the fourth hole 122*d* of the fourth lamination 126 sequentially deflect counterclockwise from a lower edge to a right edge of the lamination unit 12 from the perspective shown in the figure. Correspondingly, the first cavity channel 133 arranged at the lower right corner of the lamination unit 12 extends in the x-direction from a position near the lower side toward the interior of the lamination unit 12 and extends counterclockwise from the perspective shown in the figure.

Therefore, the cavity channel 13 rotationally extends in the circumferential direction of the stator 1 (for example, the r-direction) while extending toward the interior of the iron core 11 in the axial direction of the stator 1 (for example, the x-direction). This helps increase the length of the cavity channel 13 extending inside the iron core 11 in a meandering manner, to optimize a heat dissipation effect, and improve balance of heat dissipation at various positions of the iron core 11.

In a specific implementation, still referring to FIG. 2, FIG. 6, and FIG. 9, for lamination units 12 other than first and last lamination units 12 among the plurality of lamination units 12, hole portions 122 formed in the first and last laminations 121 in the lamination unit 12 may be in communication with edges of respective laminations 121 where the hole portions are located.

In other words, for a lamination unit 12 that is of the plurality of lamination units 12 and sandwiched by the front/rear lamination unit 12, hole portions 122 arranged on first and last laminations 121 of the lamination unit 12 extends in an extension direction to an edge of the lamination 121 to form a notch. Correspondingly, for a cavity channel 13 formed on a sandwiched lamination unit 12, an inlet 13*a* and an outlet 13*b* of the cavity channel 13 are provided on side surfaces of the lamination unit 12 around the r-direction.

In this way, it is ensured that the inlet 13*a* and the outlet 13*b* of the cavity channel 13 of the lamination unit 12 located in the middle are reliably in communication with the outside of the iron core 11, to provide a channel for gas convection.

In some embodiments, openings on first and last laminations 121 of first and last lamination units 12 of the plurality of lamination units 12 may also extend in the extension direction to be in communication with an edge of the lamination 121. Therefore, when the casing covers an outer surface of the first lamination 121 of the first lamination unit 12 and an outer surface of the last lamination 121 of the last lamination unit 12 arranged in the x-direction, a cavity channel 13 on the first and last lamination units 12 can still ensure reliable communication with the outside of the iron core 11.

In a specific implementation, a number of the plurality of laminations 121 included in the lamination unit 12 may be related to a size of hole portions 122 formed in each lamination 121 and an overlapping area of hole portions 122 formed in adjacent laminations 121 in the axial direction of the stator 1 (for example, the x-direction).

For example, if a hole portion 122 formed on a single lamination 121 has a larger size in the extension direction, a cavity channel 13 penetrating through the lamination unit 12 may be obtained by stacking a smaller number of different types of laminations 121. Correspondingly, a single lamination unit 12 includes fewer laminations 121.

In another example, if an overlapping area between hole portions 122 arranged on adjacent laminations 121 in the x-direction is larger, a larger number of laminations 121 need to be rotated and stacked to obtain a cavity channel 13 that penetrates through the lamination unit 12 and forms openings on at least two sides of the lamination unit. Correspondingly, a single lamination unit 12 includes more laminations 121.

Therefore, a number of laminations 121 included in a minimum repeating unit is properly designed according to a size of an opening on each lamination 121 and an overlapping degree of openings on adjacent laminations 121. This helps arrange as many cavity channels 13 as possible by using a space on the iron core 11 to a maximum extent, to obtain a better heat dissipation effect.

In a specific implementation, still referring to FIG. 2, FIG. 6, and FIG. 9, at least one cavity channel 13 may include at least one channel group 130 arranged in the circumferential direction of the stator 1 (for example, the r-direction). Each channel group 130 may include at least one first channel 137 arranged in the axial direction of the stator 1 (for example, the x-direction).

Specifically, cavity channels 13 arranged in different regions of the iron core 11 in the r-direction may be divided into different channel groups 130.

Further, inlets 13*a* of first channels 137 in the same channel group 130 may be located on the same side of the iron core 11. Similarly, outlets 13*b* of the first channels 137 in the same channel group 130 may also be located on the same side of the iron core 11.

Further, inlets 13*a* of first channels 137 in different channel groups 130 may be located on different sides of the iron core 11. Similarly, outlets 13*b* of the first channels 137 in the different channel groups 130 may also be located on different sides of the iron core 11.

For example, when n=1, four hole portions 122 are arranged at intervals on each lamination 121 around the r-direction, and the stator 1 includes four lamination units 12, referring to FIG. 1 and FIG. 2, the iron core 11 may include four channel groups 130 respectively located at four corners of a rectangular lamination 121, and each channel group 130 includes four first channels 137. FIG. 1 shows an example in which four lamination units 12 are stacked in an x-direction, and FIG. 2 shows an internal structure by using three of the lamination units 12 as an example.

Specifically, four first cavity channels 133 belong to the same channel group 130, four second cavity channels 134 belong to the same channel group 130, four third cavity channels 135 belong to the same channel group 130, and four fourth cavity channels 136 belong to the same channel group 130. Each of the first cavity channel 133, the second cavity channel 134, the third cavity channel 135, and the fourth cavity channel 136 may be considered as a first channel 137.

For example, when n=2, four hole portions 122 are arranged at intervals on each lamination 121 around the r-direction, and the stator 1 includes two lamination units 12, referring to FIG. 5 and FIG. 6, the iron core 11 may include four channel groups 130 respectively located at four corners of a rectangular lamination 121, and each channel group 130 includes two first channels 137.

Specifically, two first cavity channels 133 belong to the same channel group 130, two second cavity channels 134 belong to the same channel group 130, two third cavity channels 135 belong to the same channel group 130, and two fourth cavity channels 136 belong to the same channel group 130. Each of the first cavity channel 133, the second cavity channel 134, the third cavity channel 135, and the fourth cavity channel 136 may be considered as a first channel 137.

In another example, when n=3, four hole portions 122 are arranged at intervals on each lamination 121 around the r-direction, and the stator 1 includes two lamination units 12, referring to FIG. 8 and FIG. 9, the iron core 11 may include two channel groups 130 respectively located at four corners of a rectangular lamination 121, and each channel group 130 includes two first channels 137. FIG. 8 shows an example in which two lamination units 12 are stacked in an x-direction, and FIG. 9 shows an internal structure by using one of the lamination units 12 as an example.

Specifically, two first cavity channels 133 belong to the same channel group 130, two second cavity channels 134 belong to the same channel group 130, two third cavity channels 135 belong to the same channel group 130, and two fourth cavity channels 136 belong to the same channel group 130. Each of the first cavity channel 133, the second cavity channel 134, the third cavity channel 135, and the fourth cavity channel 136 may be considered as a first channel 137.

Further, the first channel 137 may be formed by providing openings on laminations 121 of the single lamination unit 12.

The first cavity channel 133 is used as an example. Four laminations 121 of the single lamination unit 12 may form one first cavity channel 133.

Alternatively, the first channel 137 may also be jointly formed by laminations 121 of adjacent lamination units 12. The second cavity channel 134 is used as an example. The laminations 121 of the adjacent lamination units 12 jointly form one second cavity channel 134.

Therefore, at least one channel group 130 is distributed along the circumferential direction of the stator 1 (for example, the r-direction), and a first channel 137 in each channel group 130 penetrates through at least a part of the iron core 11 along the axial direction of the stator 1 (for example, the x-direction), so that heat inside the iron core 11 can naturally flow from a lower inlet 13*a* of each first channel 137 to an upper outlet 13*b* along the first channel 137, thereby quickly dissipating heat to the outside of the iron core 11.

Further, for each channel group 130, a plurality of independent first channels 137 are provided, so that numbers of inlets 13*a* and outlets 13*b* can be increased, and the heat dissipation surface area inside the iron core 11 may further be increased, to better improve the heat dissipation performance.

In a specific implementation, still referring to FIG. 1 to FIG. 10, the at least one channel group 130 may include a first channel group 131 and a second channel group 132. In the axial direction of the stator 1 (for example, the x-direction), the second channel group 132 and the first channel group 131 may have a height difference.

For example, referring to FIG. 6, the first channel group 131 may include at least one first cavity channel 133 arranged in the x-direction, and the second channel group 132 may include at least one second cavity channel 134 arranged in the x-direction. In the z-direction, the first channel group 131 may be located below the second channel group 132.

In another example, the first channel group 131 may include at least one fourth cavity channel 136 arranged in the x-direction, and the second channel group 132 may include at least one third cavity channel 135 arranged in the x-direction. In the z-direction, the first channel group 131 may be located below the second channel group 132.

Further, an outlet 13*b* in communication with each first channel 137 in the first channel group 131 and an inlet 13*a* in communication with each first channel 137 in the second channel group 132 may be located on an outer surface of the same side of the lamination unit 12.

For example, the first channel group 131 includes the first cavity channel 133, and the second channel group 132 includes the second cavity channel 134. An outlet 13*b* of the first channel group 131 is located on a right side of the iron core 11, and an inlet 13*a* of the second channel group 132 is also located on the right side of the iron core and is located above the outlet 13*b* of the first channel group 131. The outlet 13*b* of the first channel group 131 may reuse the fourth hole 122*d* of the fourth lamination 123, and the inlet 13*a* of the second channel group 132 may reuse the first hole 122*a* of the fourth lamination 126.

For example, the first channel group 131 includes a fourth cavity channel 136, and the second channel group 132 includes a third cavity channel 135. An outlet 13*b* of the first channel group 131 is located on a left side of the iron core 11, and an inlet 13*a* of the second channel group 132 is also located on the left side of the iron core and is located above the outlet 13*b* of the first channel group 131. The outlet 13*b* of the first channel group 131 may reuse the first hole 122*a* of the second lamination 124, and the inlet 13*a* of the second channel group 132 may reuse the fourth hole 122*b* of the second lamination 124.

In this way, an airflow enters the second channel group 132 through the first channel group 131 and then is finally discharged out of the motor, to increase the length of the cavity channel 13 through which the airflow flows inside the iron core 11 as a whole, and bring more heat out of the iron core 11 as much as possible, thereby further enhancing the heat dissipation effect.

Figure 11:
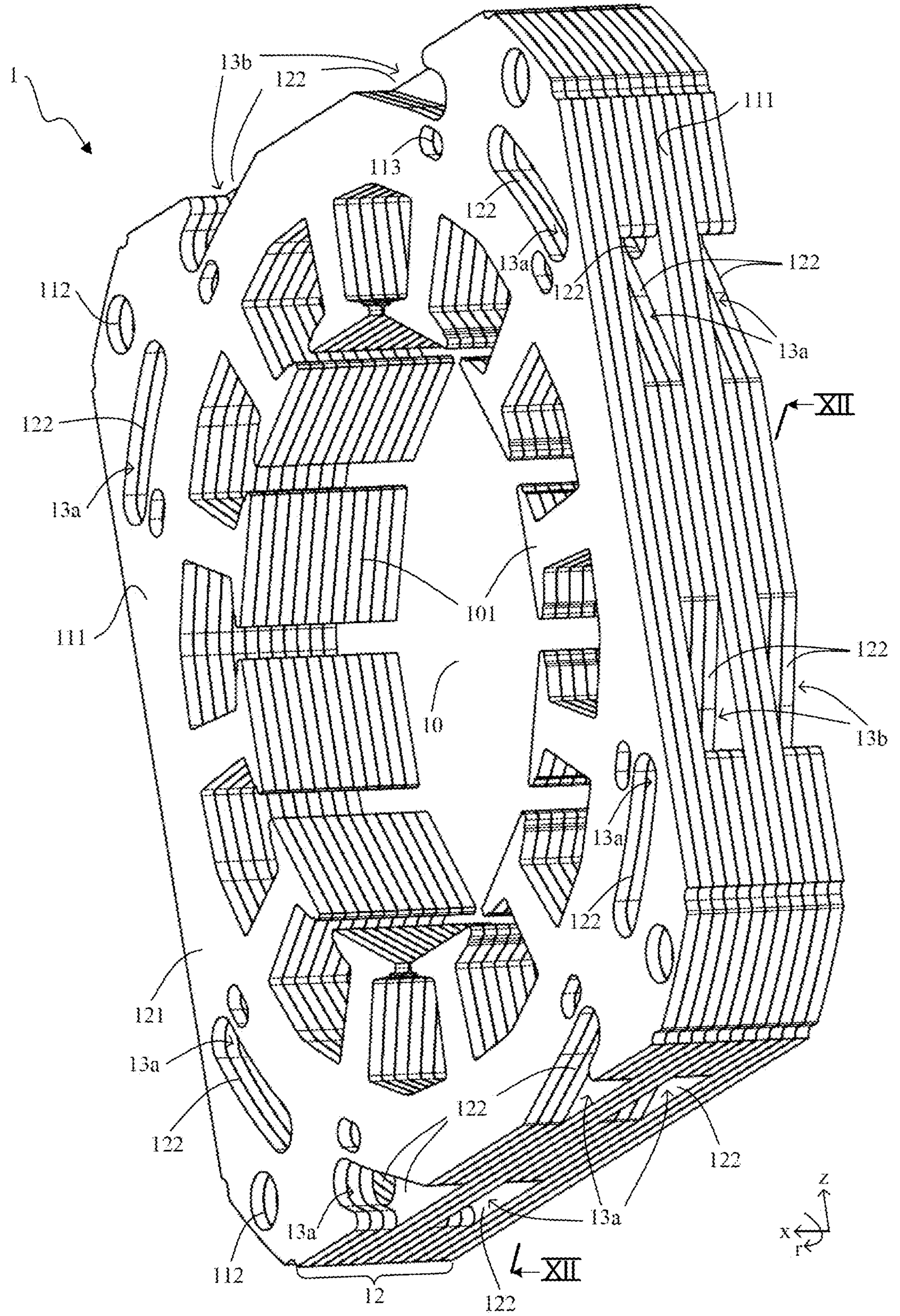
FIG. 11 is a diagram perspective view of the stator for the motor according to a second embodiment of the present invention.
Figure 12:
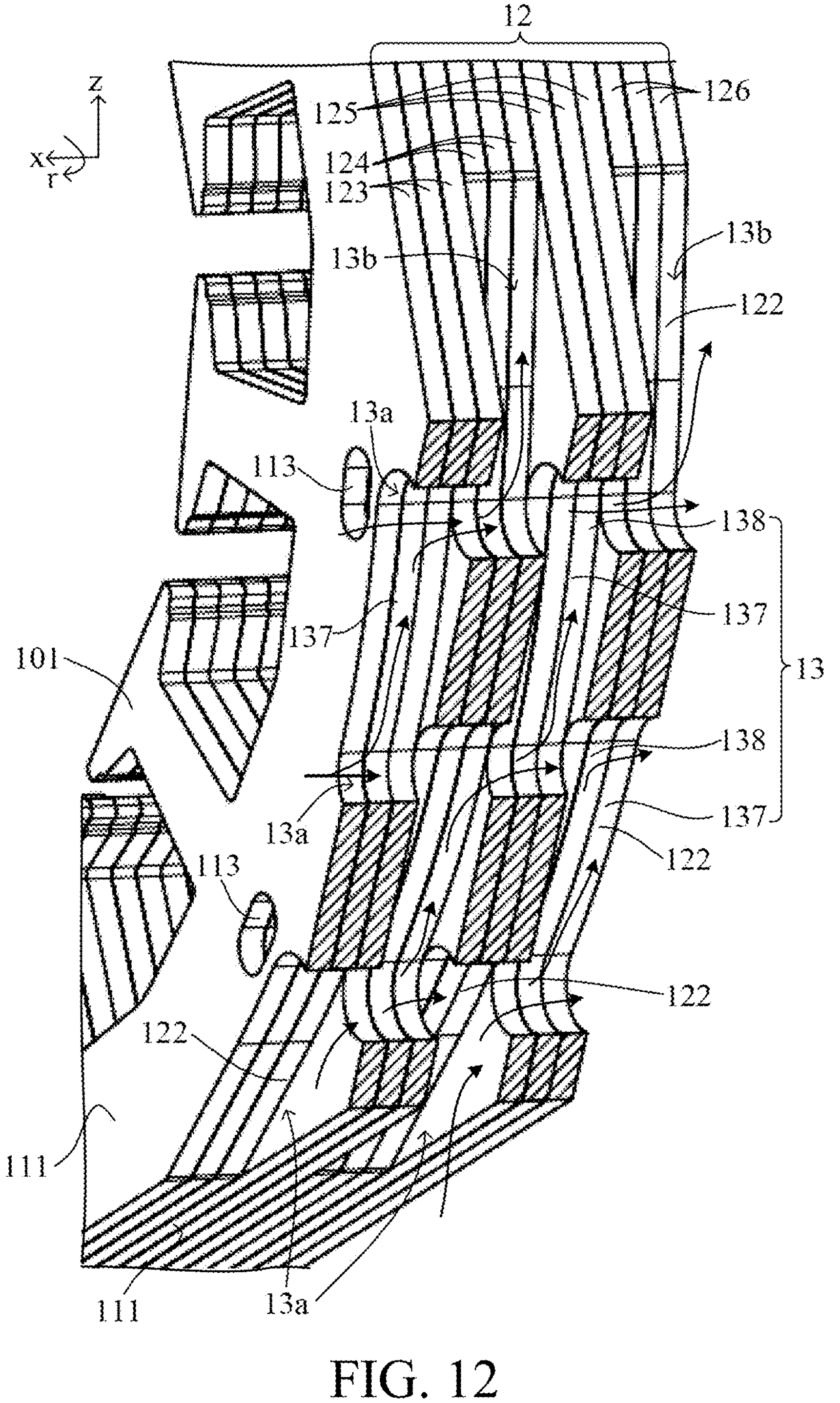
FIG. 12 is a perspective, sectional view taken along line XII-XII shown in FIG. 11.
Figure 13:
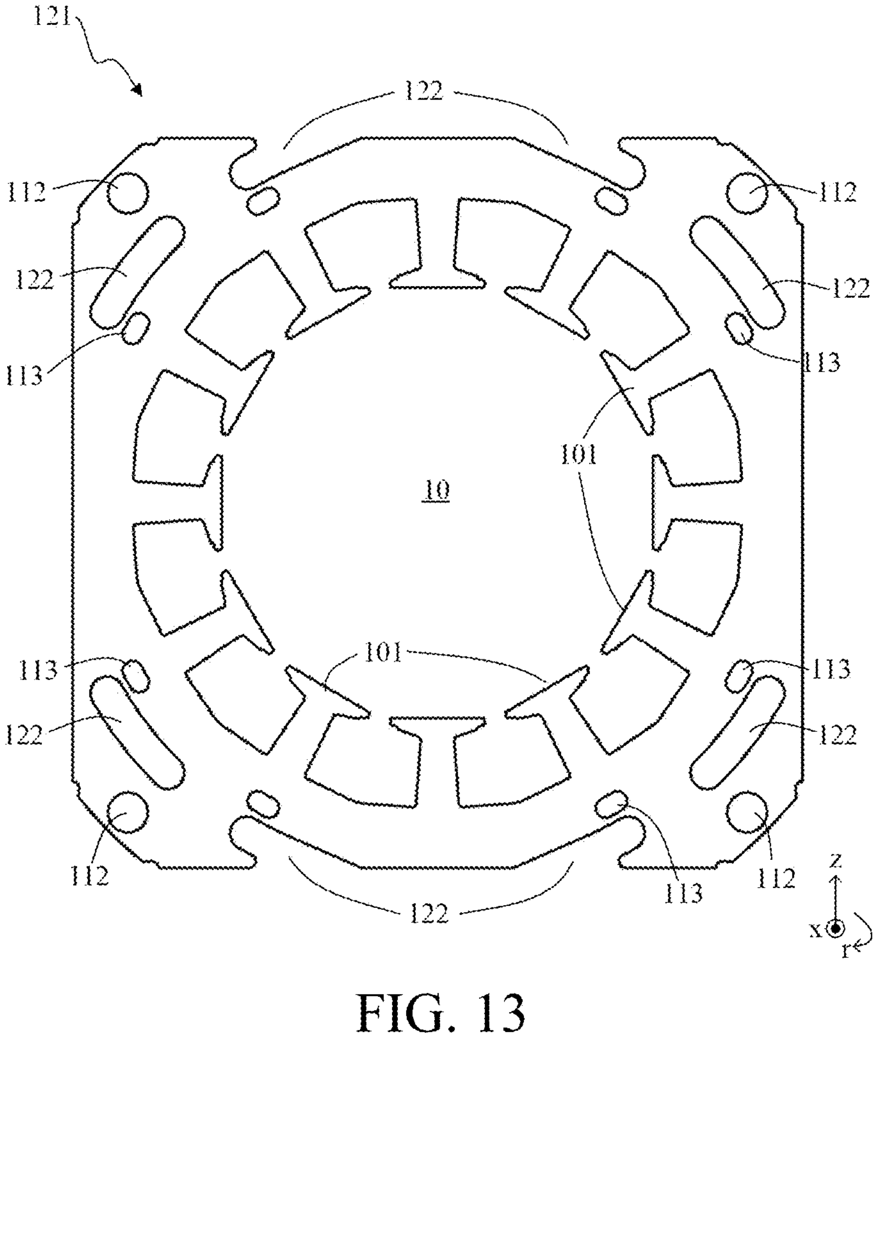
FIG. 13 is a front view of the lamination shown in FIG. 11.

In a specific implementation, referring to FIG. 11 to FIG. 13, the cavity channel 13 may further include a second channel 138, and at least some adjacent first channels 137 of the plurality of first channels 137 are in communication with each other through the second channel 138.

Specifically, a number of openings on the laminations 121 is increased. In this way, in addition to the first channel 137 extending from bottom to top in a meandering manner, the cavity channel 13 obtained by rotating and stacking the plurality of laminations 121 may further include a second channel 138 extending in the axial direction of the stator 1 (for example, the x-direction).

For example, first channels 137 in each channel group 130 are in communication through corresponding second channels 138.

Further, the second channel 138 may be configured to be in communicate with a first channel 137 of adjacent minimum repeating units (for example, lamination units 12). For example, based on vertical passages originally extending around the circumferential direction of the stator 1, passages linearly extending in the axial direction of the stator 1 are added to be in communication with the vertical passages. In this way, the heat dissipation surface area inside the iron core may be further increased, to optimize the heat dissipation effect.

In some embodiments, a density of hole portions 122 arranged in the circumferential direction of the stator 1 (for example, the r-direction) may be increased, to increase the number of openings on the lamination 121. For example, referring to FIG. 13, for each square lamination 121, two hole portions 122 may be formed at each corner of the lamination 121, where one of the two hole portions 122 extends to an edge of the lamination 122 in a direction away from the other hole portion. Further, the hole portions 122 formed at the four corners may be symmetric vertically and horizontally.

In some embodiments, the hole portion 122 may extend in an arc shape. Further, a radian of the arc may be fitted with a radian of the through hole 10.

In some embodiments, each lamination 121 may be provided with fixing holes 112 spaced apart in the circumferential direction r. For each lamination unit 12, fixing holes 112 on all laminations 121 included in the lamination unit 12 are penetrated in the x-direction. Further, each fixing hole 112 is adapted to fit with a fixing member such as a screw to fix at least one lamination unit 12 into one body.

In some embodiments, each lamination 121 may be provided with mounting holes 113 spaced apart in the circumferential direction r, for mounting an insulating skeleton (not shown). During actual application, the mounting hole 113 may be eliminated.

An embodiment of the present invention further provides a motor, including the stator 1 shown in any one of the foregoing embodiments shown in FIG. 1 to FIG. 13. The stator 1 with a better heat dissipation effect is used, so that the motor has less a less power consumption loss and a higher power density.

An embodiment of the present invention further provides a household appliance, including: a housing; and a motor, arranged in the housing, where the motor includes the stator 1 according to any one of the foregoing embodiments shown in FIG. 1 to FIG. 13. In some embodiments, the household appliance may be, for example, a refrigerating appliance, a washing machine, a drying machine, or a range hood. The refrigerating appliance may include a refrigerator, a freezer, and the like. In this embodiment, a stator 1 with a better heat dissipation effect is used, so that a motor arranged in the household appliance has less a less power consumption loss and a higher power density. This helps reduce overall power consumption of the household appliance, and better meet an energy-saving environmental requirement.

Although specific implementations have been described above, these implementations are not intended to limit the scope of the present disclosure, even if only one implementation is described with respect to specific features. The feature example provided in the present disclosure is intended to be illustrative rather than limiting, unless otherwise stated. In a specific implementation, the technical features of one or more dependent claims may be combined with the technical features of the independent claims, and the technical features from the corresponding independent claims may be combined in any appropriate manner, rather than only in the specific combinations listed in the claims.

Although the present invention is disclosed above, the present invention is not limited thereto. Any person skilled in the art may make various changes and modifications without departing from the spirit and the scope of the present invention. Therefore, the protection scope of the present invention should be subject to the scope defined by the claims.

The following is a summary list of reference numerals and the corresponding structure used in the above description of the invention:

1 stator;
10 through hole;
101 teeth;
11 iron core;
111 outer surface of the iron core;
112 fixing hole;
113 mounting hole;
12 lamination unit;
121 lamination;
122 hole portion;
122*a* first hole;
122*b* second hole;
122*c* third hole;
122*d* fourth hole;
123 first lamination;
124 second lamination;
125 third lamination;
126 fourth lamination;
13 cavity channel;
13*a* inlet; 13*b*—outlet;
130 channel group;
131 first channel group;
132 second channel group;
133 first cavity channel;
134 second cavity channel;
135 third cavity channel;
136 fourth cavity channel;
137 first channel;
138 second channel;
x axial direction of the stator;
r circumferential direction of the stator; and
Z height direction of the stator.

The invention claimed is:

1. A stator for a motor, the stator comprising:

an iron core having at least one lamination unit disposed in an axial direction of the stator, said at least one lamination unit having at least one cavity channel formed therein, said at least one lamination unit for each of said at least one cavity channel having an inlet and an outlet formed on outer surfaces of said at least one lamination unit and being in communication with a respective one of said at least one cavity channel, and in the axial direction of the stator, said outlet and said inlet have a height difference, such that said inlet is on a first axial position and said outlet is on a second axial position being different from the first axial position;

wherein said inlet and said outlet that are in communication with a same said at least one cavity channel are respectively formed on said outer surfaces on different sides of said at least one lamination unit;

wherein said at least one lamination unit contains a plurality of laminations, each of said laminations having a hole portion formed therein, and said hole portion is suitable for forming a part of said at least one cavity channel; and wherein said laminations are square-shaped laminations, said plurality of square-shaped laminations sequentially rotate by a preset angle to stack into said at least one lamination unit, and in each of said square-shaped laminations is a plurality of said hole portions being formed therein in a circumferential direction of the stator, and said plurality of hole portions respectively formed in every two adjacent said square-shaped laminations are penetrated in the axial direction of the stator, to form a plurality of cavity channels.

2. The stator according to claim 1, wherein:

said laminations include a first lamination, a second lamination, a third lamination, and a fourth lamination that are sequentially disposed in the axial direction of the stator;

said laminations have a first hole, a second hole, a third hole, and a fourth hole formed therein and are sequentially disposed in a circumferential direction of the stator;

said at least one cavity channel contains a first cavity channel, a second cavity channel, a third cavity channel, and a fourth cavity channel;

every two of said first hole of said first lamination, said second hole of said second lamination, said third hole of said third lamination, and said fourth hole of said fourth lamination are penetrated in the axial direction of the stator to form said first cavity channel;

every two of said second hole of said first lamination, said third hole of said second lamination, said fourth hole of said third lamination, and said first hole of said fourth lamination are penetrated in the axial direction of the stator to form said second cavity channel;

every two of said third hole of said first lamination, said fourth hole of said second lamination, said first hole of said third lamination, and said second hole of said fourth lamination are penetrated in the axial direction of the stator to form said third cavity channel; and every two of said fourth hole of said first lamination, said first hole of said second lamination, said second hole of said third lamination, and said third hole of said fourth lamination are in communication in the axial direction of the stator to form said fourth cavity channel.

3. The stator according to claim 2, wherein for each of said cavity channels, projections of said hole portions formed in adjacent said laminations and suitable for forming a cavity channel at least partially overlap in the axial direction of the stator.

4. The stator according to claim 3, wherein said projections of said hole portions formed in at least two adjacent said laminations completely overlap in the axial direction of the stator.

5. The stator according to claim 3, wherein in the axial direction of the stator, said projections of said hole portions that are formed in each of said laminations contained in said at least one lamination unit and that are suitable for forming a same cavity channel deflect clockwise or anticlockwise in the axial direction of the stator.

6. The stator according to claim 1, wherein:

said at least one lamination unit is one of a plurality of lamination units; and for said lamination units other than first and last lamination units among said plurality of lamination units, said hole portions formed in said first and last laminations in said lamination unit are in communication with edges of respective said laminations where said hole portions are located.

7. The stator according to claim 1, wherein a number of said plurality of laminations contained in said at least lamination unit is related to a size of said hole portions formed in each of said laminations and an overlapping area of said hole portions formed in adjacent said laminations in the axial direction of the stator.

8. The stator according to claim 1, wherein said at least one cavity channel contains at least one channel group disposed in a circumferential direction of the stator, wherein said at least one channel group contains at least one first channel disposed in the axial direction of the stator.

9. The stator according to claim 8, wherein said at least one channel group includes a first channel group and a second channel group, and in the axial direction of the stator, said second channel group and said first channel group have a height difference, wherein said outlet in communication with each said first channel in said first channel group and said inlet in communication with each said first channel in said second channel group are disposed on an outer surface of a same side of said at least one lamination unit.

10. The stator according to claim 8, wherein:

said at least one first channel is one of a plurality of first channels; and said at least one cavity channel further comprises second channels, and at least some adjacent first channels of said plurality of first channels are in communication with each other through said second channels.

11. A motor, comprising:

the stator according to claim 1.

12. A household appliance, comprising:

a housing; and the motor according to claim 11, said motor disposed in said housing.

13. A stator for a motor, the stator comprising:

an iron core having at least one lamination unit disposed in an axial direction of the stator, said at least one lamination unit having at least one cavity channel formed therein, said at least one lamination unit for each of said at least one cavity channel having an inlet and an outlet formed on outer surfaces of said at least one lamination unit and being in communication with a respective one of said at least one cavity channel, and in the axial direction of the stator, said outlet and said inlet have a height difference;

said at least one lamination unit contains laminations including a first lamination, a second lamination, a third lamination, and a fourth lamination that are sequentially disposed in the axial direction of the stator;

said laminations have a first hole, a second hole, a third hole, and a fourth hole formed therein and are sequentially disposed in a circumferential direction of the stator;

said at least one cavity channel contains a first cavity channel, a second cavity channel, a third cavity channel, and a fourth cavity channel;

every two of said first holes of said first lamination, said second holes of said second lamination, said third holes of said third lamination, and said fourth holes of said fourth lamination are penetrated in the axial direction of the stator to form said first cavity channel;

every two of said second holes of said first lamination, said third holes of said second lamination, said fourth holes of said third lamination, and said first holes of said fourth lamination are penetrated in the axial direction of the stator to form said second cavity channel;

every two of said third holes of said first lamination, said fourth holes of said second lamination, said first holes of said third lamination, and said second holes of said fourth lamination are penetrated in the axial direction of the stator to form said third cavity channel;

every two of said fourth holes of said first lamination, said first holes of said second lamination, said second holes of said third lamination, and said third holes of said fourth lamination are in communication in the axial direction of the stator to form said fourth cavity channel;

for each of said cavity channels, projections of said hole portions formed in adjacent said laminations and suitable for forming a cavity channel at least partially overlap in the axial direction of the stator; and wherein said projections of said hole portions formed in at least two adjacent said laminations completely overlap in the axial direction of the stator.

14. The stator according to claim 13, wherein said inlet and outlet that are in communication with a same said at least one cavity channel are respectively formed on said outer surfaces on different sides of said at least one lamination unit.

15. The stator according to claim 13, wherein said at least one lamination unit contains a plurality of laminations, each of said laminations having a hole portion formed therein, and said hole portion is suitable for forming a part of said at least one cavity channel.

16. The stator according to claim 15, wherein a number of said plurality of laminations contained in said at least lamination unit is related to a size of said hole portions formed in each of said laminations and an overlapping area of said hole portions formed in adjacent said laminations in the axial direction of the stator.

17. The stator according to claim 13, wherein said at least one lamination unit contains a plurality of laminations in a same shape, wherein said plurality of laminations sequentially rotate by a preset angle to stack into said at least one lamination unit, and in each of said laminations is a plurality of hole portions being formed therein in a circumferential direction of the stator, and said plurality of hole portions respectively formed in every two adjacent said laminations are penetrated in the axial direction of the stator, to form a plurality of cavity channels.

18. The stator according to claim 17, wherein:

said at least one lamination unit is one of a plurality of lamination units; and for said lamination units other than first and last lamination units among said plurality of lamination units, said hole portions formed in said first and last laminations in said lamination unit are in communication with edges of respective said laminations where said hole portions are located.

19. The stator according to claim 13, wherein in the axial direction of the stator, said projections of said hole portions that are formed in each of said laminations contained in said at least one lamination unit and that are suitable for forming a same cavity channel deflect clockwise or anticlockwise in the axial direction of the stator.

20. The stator according to claim 13, wherein said at least one cavity channel contains at least one channel group disposed in a circumferential direction of the stator, wherein said at least one channel group contains at least one first channel disposed in the axial direction of the stator.

* * * * *